United States Patent
Bates et al.

(10) Patent No.: US 12,155,880 B2
(45) Date of Patent: *Nov. 26, 2024

(54) SYSTEMS AND METHODS FOR MANAGEMENT OF MEDIA CONTENT SUBSCRIPTIONS

(71) Applicant: Adeia Guides Inc., San Jose, CA (US)

(72) Inventors: Adam Bates, Los Gatos, CA (US); Hafiza Jameela, Milpitas, CA (US); Jesse F. Patterson, Pacifica, CA (US); Mark K. Berner, Santa Clara, CA (US); Eric Dorsey, Palo Alto, CA (US); Jonathan A. Logan, Mountain View, CA (US); David W. Chamberlin, Pacifica, CA (US); Paul Stevens, Felton, CA (US); Herbert A. Waterman, Merced, CA (US); William L. Thomas, Evergreen, CO (US)

(73) Assignee: Adeia Guides Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,752

(22) Filed: Jul. 13, 2023

(65) Prior Publication Data
US 2023/0362424 A1 Nov. 9, 2023

Related U.S. Application Data

(63) Continuation of application No. 17/746,533, filed on May 17, 2022, now Pat. No. 11,750,868, which is a (Continued)

(51) Int. Cl.
H04N 21/2543 (2011.01)
H04N 21/25 (2011.01)
(Continued)

(52) U.S. Cl.
CPC ....... *H04N 21/2543* (2013.01); *H04N 21/251* (2013.01); *H04N 21/25891* (2013.01); *H04N 21/4532* (2013.01); *H04N 21/4826* (2013.01)

(58) Field of Classification Search
CPC .......... H04N 21/2543; H04N 21/4532; H04N 21/4826; H04N 21/251; H04N 21/25891
See application file for complete search history.

(56) References Cited

U.S. PATENT DOCUMENTS 6,239,794 B1  5/2001  Yuen et al.
6,564,378 B1  5/2003  Satterfield et al.
(Continued)

OTHER PUBLICATIONS

"IPRP", International Preliminary Report on Patentability for International Application No. PCT/US2018/039325, dated Jun. 30, 2020.
(Continued)

*Primary Examiner* — Nnenna N Ekpo
(74) *Attorney, Agent, or Firm* — Haley Guiliano LLP

(57) ABSTRACT

Systems and methods are provided for managing subscriptions. A media guidance application obtaining viewing patterns of a subscriber and determining a first and second media package of interest to the subscriber. A first and second release schedule are obtained related to media content in the first and second media packages. The media guidance application predicts a first viewing impact of the first subscription and a second viewing impact of the second subscription, for the upcoming time period, wherein the viewing impact indicates a total predicted amount of time spent viewing the media packages in the upcoming time period. An available amount of time for viewing media in the upcoming time period is also determined. The media guidance application generates a subscription recommendation for the upcoming time period based on the first viewing impact, second viewing impact, and available amount of time for viewing media in the upcoming time period.

16 Claims, 13 Drawing Sheets

Related U.S. Application Data continuation of application No. 16/958,372, filed as application No. PCT/US2018/039325 on Jun. 25, 2018, now Pat. No. 11,363,320, which is a continuation of application No. 15/857,139, filed on Dec. 28, 2017, now Pat. No. 10,582,238.

(51) Int. Cl.
  *H04N 21/258* (2011.01)
  *H04N 21/45* (2011.01)
  *H04N 21/482* (2011.01)

(56) References Cited

U.S. PATENT DOCUMENTS

| | | |
|---|---|---|
| 7,165,098 B1 | 1/2007 | Boyer et al. |
| 7,761,892 B2 | 7/2010 | Ellis et al. |
| 8,046,801 B2 | 10/2011 | Ellis et al. |
| 11,750,868 B2 | 9/2023 | Bates et al. |
| 2002/0029385 A1* | 3/2002 | Moir .............. H04N 21/84 725/53 |
| 2002/0174430 A1 | 11/2002 | Ellis et al. |
| 2005/0251827 A1 | 11/2005 | Ellis et al. |
| 2010/0153885 A1 | 6/2010 | Yates |
| 2010/0250421 A1 | 9/2010 | Ariff et al. |
| 2011/0321072 A1* | 12/2011 | Patterson ........ H04N 21/239 725/5 |
| 2013/0030994 A1 | 1/2013 | Calman et al. |
| 2013/0263174 A1* | 10/2013 | Chaudhari ...... H04N 21/47211 725/28 |
| 2014/0223480 A1* | 8/2014 | Berry ............. H04N 21/4826 725/40 |
| 2016/0066049 A1* | 3/2016 | Mountain ....... H04N 21/4622 725/58 |
| 2016/0134929 A1* | 5/2016 | Robii ............. H04N 21/4508 725/81 |
| 2017/0094332 A1 | 3/2017 | Thomas et al. |
| 2017/0094361 A1 | 3/2017 | Thomas et al. |
| 2017/0180790 A1* | 6/2017 | Howard .............. H04L 67/568 |
| 2017/0280196 A1* | 9/2017 | Thomas ........ H04N 21/4826 |
| 2023/0007327 A1 | 1/2023 | Bates et al. |

OTHER PUBLICATIONS

"ISR", PCT International Search Report for International Application No. PCT/US2018/039325, dated Oct. 2, 2018.
"Trim Launches Trim Savings", Trim Launches Trim Savings, A New Way for Consumers to Save Money, downloaded Dec. 28, 2017; http://www.asktrim.com/blog (15 pages).
"Trim, Frequently Asked Questions", Trim, Frequently Asked Questions, downloaded Dec. 28, 2017; https://www.asktrim.com/faq (4 pages).
"Trim, Our Mission", Trim, Our Mission, downloaded Dec. 28, 2017; http://www.asktrim.com/about (13 pages).

\* cited by examiner

SYSTEMS AND METHODS FOR MANAGEMENT OF MEDIA CONTENT SUBSCRIPTIONS

CROSS-REFERENCE TO RELATED APPLICATIONS

This application is a continuation of U.S. patent application Ser. No. 17/746,533, filed May 17, 2022, which is a continuation of U.S. patent application Ser. No. 16/958,372, filed Jun. 26, 2020, now U.S. Pat. No. 11,363,320, which is a national stage application under 35 U.S.C. § 371 of International Application PCT/US2018/039325, filed Jun. 25, 2018, which is a continuation of U.S. patent application Ser. No. 15/857,139, filed Dec. 28, 2017, now U.S. Pat. No. 10,582,238, the disclosure of which are hereby incorporated by reference herein in their entireties.

BACKGROUND

Users often subscribe to several media content subscriptions. A subscriber may subscribe to television programming services, e.g., services provided by companies like Comcast™, Verizon™, DirecTV™, or Dish Network™. At the same time, a subscriber may subscribe to premium packages within a television programming service such as HBO™ or Showtime™. In recent years, online streaming services, e.g., HBO Now™, Netflix™, and Amazon Prime™ Video, have become popular with media consumers. And users often subscribe to one or more online streaming services at the same time as subscribing to a television programming service including, at times, premium packages. Still other content sources, for example, online video sharing platforms like YouTube™, are available to users under free, ad-based, and subscription models. Therefore, users are often oversubscribed to media content services, and inefficiently maintain subscriptions to services for media content they cannot consume. Furthermore, media content from one service may be available on another service at the same time or become available on another service later in time. And users may not realize they are oversubscribed to media content subscriptions. For example, a subscriber may maintain a premium subscription to HBO along with a television programming service, even though the shows the subscriber watches from HBO are offered for free in another media content subscription the subscriber maintains, such as Amazon Prime Video. Furthermore, a subscriber may find the they are primarily interested in a subset of content from a media content subscription. For example, a subscriber may only be interested in a particular show on HBO and does not watch HBO except when new episodes of that show are released. Thus, maintaining a subscription to HBO when the show is on hiatus, i.e., new episodes will not soon be released, is an inefficient use of the subscriber's resources. Various systems exist to track what media content users consume, and other systems exists to track what media content will be released in an upcoming release schedule. However, these systems are not effective to manage several media content subscriptions based on efficiently subscribing a subscriber to several media content subscriptions.

SUMMARY

Therefore systems and methods for managing a plurality of subscriptions to a plurality of media packages are provided herein. A media guidance application obtains viewing patterns of a subscriber that has a plurality of subscriptions to media content, i.e., media content subscriptions. For example, the media guidance application may receive a listing of dates, times, channels, program metadata, ratings information, duration of viewing, channel change indications, or other data associated with a subscriber's consumption of media content. In a multi-subscriber home, the media guidance application may obtain view patterns for each subscriber in the home as a single collection of patterns per subscriber or a combined collection of patterns for all users.

While media guidance applications may collect viewing patterns and media content subscriptions, current systems lack the functionality to interpret this information into a form that is useable for predicting future use. Specifically, current systems fail to create records of both the amount of time a subscriber will likely spend consuming media content as well as the amount of time the subscriber will likely spend consuming media content from a particular subscription; thus, these systems cannot apportion the amount of time a subscriber will likely spend consuming media in a given time period (e.g., a month) between media content subscriptions when each subscription is associated with a unique amount of time the subscriber will likely spend consuming media content. Because current systems fail to create records for this information, this information, and the resulting functionality to manage media content subscriptions, is unavailable to these systems. In contrast, by creating records of this specific information, and using these records to apportion the amount of time a subscriber will likely spend consuming media in a given time period between media content subscriptions when each subscription is associated with a unique amount of time the subscriber will likely spend consuming media content, the present embodiments generate recommendations for particular media content subscriptions during particular time periods based on the recorded information. These improvements allow a system to efficiently manage a subscriber's resources both along time and budget as subscriptions are automatically added and removed from a subscriber's set of active subscriptions. As a result, the overall viewing experience of the subscriber is improved as well as the subscriber's efficient use of subscriptions.

The media guidance application determines, based on the viewing patterns of the subscriber, a first media package of interest to the subscriber from the plurality of media packages. The first media package of interest is related to a first subscription. For example, the media guidance application may receive viewing patterns that indicate that a subscriber is subscribed to HBO, a premium television package. From the viewing patterns, the media guidance application may determine that a subscriber watches the HBO program Game of Thrones™, an episodic show released through HBO's premium service. The media guidance application may further determine that the subscriber watches new Game of Thrones episodes as soon as a new episode is released on HBO. In this example, Game of Thrones is a media package of interest related to the HBO subscription based on the subscriber's viewing patterns.

As used herein, "viewing patterns" is defined to mean a collection of information that indicates a viewer's or multiple viewers' media content consumption. In some embodiments, the viewing patterns are stored as a log of dates, times, channels, and program metadata that identifies which shows a viewer watched, how long the shows were watched, and/or whether the viewer interrupted his/her viewing experience. In some embodiments, the viewing patterns contain unprocessed data that can be analyzed to understand the viewer's habits for watching media, e.g. the viewer watched Season 1 Episode 1 of Game of Thrones on Channel 65 from timecode 00:00 to timecode 32:04 on Apr. 6, 2017 from 9:53 PM until 10:25 PM. In some embodiments, the viewing patterns contain high level summary information related to the viewer's consumption of media, e.g., the viewer has watched 84% of Game of Thrones and the viewer's consumption of Game of Thrones accounts for 2.3% of all viewer's media consumption. In some embodiments, the viewing patterns are stored in database entries associated with the viewer. In some embodiments, the viewing patterns are transmitted from a server that stores, collects, and analyzes viewing patterns.

In some embodiments, the media guidance application determines the first media package of interest to the subscriber from a plurality of media packages using the total viewing time of a subscription and viewing time associated with a candidate media package. For example, the media guidance application may determine that the subscriber subscribes to HBO and HBO is releasing a new season of Game of Thrones and a new season of Westworld™. Both Game of Thrones and Westworld arc media packages related to a first subscription, HBO. The media guidance application determines a total viewing time associated with the subscriber and the plurality of media packages based on the viewing patterns of the subscriber. For example, the media guidance application may determine that the subscriber historically spends approximately 300 minutes viewing HBO shows in July and August. The media guidance application determines a candidate media package from the plurality of media packages. For example, the media guidance application may determine that Game of Thrones is a potential media package of interest because the subscriber historically watches Game of Thrones during the upcoming time period, perhaps July and August. The media guidance application determines a candidate media package viewing time associated with the subscriber and the candidate media package. Continuing the example, the media guidance application may determine that the upcoming run time of Game of Thrones for July and August is 445 minutes. The media guidance application identifies the candidate media package as the first media package of interest, based on a comparison of the total viewing time and the first package viewing time. For example, the media guidance application may determine that Game of Thrones is an important media package from the HBO subscription because its run time accounts for a large amount of time in comparison to the subscriber's historical consumption of HBO for the same time period.

The media guidance application continues by determining, based on the viewing patterns of the subscriber, a second media package of interest to the subscriber from the plurality of media packages, the second media package of interest being related to a second subscription. For example, the media guidance application may determine that a subscriber is subscribed to Netflix, an online streaming service. From the subscriber's viewing history, the media guidance application may determine that the subscriber watches episodes of Mindhunter™, an episodic show released through Netflix's service. In this example, the media guidance application may determine that the subscriber watched an entire season of Mindhunter in one sitting, a behavior sometimes referred to as "binge watching." Based on this viewing pattern, the media guidance application may determine that Mindhunter is a media package of interest related to the Netflix subscription. For example, the media guidance application may determine the second media package of interest to the subscriber based on the total viewing time of a subscription and viewing time associated with a candidate media package.

The media guidance application obtains a first release schedule related to media content in the first media package to be released in an upcoming time period. Carrying through with the example above, new seasons of Game of Thrones were historically released during the summer months. In this example, the media guidance application may obtain a schedule of new episodes of Game of Thrones from an upcoming season that will be released in the summer. The media guidance application also obtains a second release schedule related to media content in the second media package to be released in the upcoming time period. In this case, the media guidance application may determine that a new season of Mindhunter will be released all at once in the fall, perhaps October.

As used herein, "release schedule" is defined to mean a collection of information related to the availability of media content. For example, a release schedule for Game of Thrones may indicate the channel, date, and time when new episodes of the show will be released in an upcoming season. For example, Game of Thrones historically has been released in July and August each year. A release schedule associated with a Game of Thrones season may indicate the dates in July and August on which new episodes will be released along with the time and channel on which the episodes will be released. The media guidance application can use this information to correlate upcoming episodes with related media content subscriptions. A release schedule may contain information related to a single show, a collection of shows, a channel, and/or a collection of channels, and it may contain information for various time periods, e.g., the upcoming week, upcoming month, or upcoming year.

The media guidance application predicts, using the first release schedule and the viewing patterns of the subscriber, a first viewing impact of the first subscription for the upcoming time period. The media guidance application predicts the first viewing impact to indicate a total predicted amount of time that a subscriber will spend viewing the first media package in the upcoming time period. For example, the media guidance application may determine that the upcoming season of Game of Thrones will run 445 minutes and, based on the fact that the subscriber's viewing history indicates the subscriber watches the entirety of each Game of Thrones episode, the media guidance application predicts the subscriber will watch the entirety of each new episode of Game of Thrones as it is released in July and August. Therefore, the media guidance application predicts that the viewing impact of Game of Thrones will be 445 minutes in the July and August time period. In other examples, the media guidance application may predict the impact of the media package at different granularities. For example, the media guidance application predicts the viewing impact on daily, weekly, monthly, seasonally, or yearly basis. The media guidance application may also determine viewing impact based on a subscription period related to the corresponding media content subscription. For example, the media guidance application may determine that the subscriber is billed for HBO every month on the ninth, and determine the viewing impact associated with an upcoming release of Game of Thrones between July 9th and August 9th.

As used herein, "viewing impact" is defined to mean information corresponding to the amount of time a viewer, or a group of viewers, has spent, or is predicted to spend, consuming media content. A viewing impact may be associated with a show, a season within a series, an entire series, a movie, a channel, or a group of channels. Furthermore, a viewing impact may be stored as an amount of time, e.g., seconds, minutes, or hours, related to the consumption of media. Further, a viewing impact may be stored as a percentage of total viewing, e.g., 2%. Still further, a viewing impact may be associated with a specific time period in the past or future, or may be indicative the viewer's recorded viewing history.

The media guidance application predicts, using the second release schedule and the viewing patterns of the subscriber, a second viewing impact of the second subscription for the upcoming time period. The media guidance application predicts the second viewing impact to indicate a total predicted amount of time spent viewing the second media package in the upcoming time period. Continuing the prior example, the media guidance application may predict that the subscriber will consume all of Mindhunter on the day the new season is released, perhaps October 10th. Therefore, the media guidance application predicts the viewing impact of Mindhunter on October 10th will be, for example, 325 minutes. But the media guidance application also determines that the viewing impact of Mindhunter outside of October 10th will be nothing.

The media guidance application determines an available amount of time for viewing media in the upcoming time period. For example, the media guidance application may determine that a subscriber spends 100 minutes each month viewing media content across all services. And if the upcoming time period is July and August, then the media guidance application may determine that the available amount of time for viewing media is 200 minutes. In other examples, the media guidance application may use historical viewing patterns to more accurately determine the available amount of time. For example, the media guidance application may analyze the subscriber's viewing patterns and determine that, historically, the subscriber consumes 165 minutes of content in July and 120 minutes of content in August. In that example, the available amount of time for viewing media content in July and August is 285 minutes.

The media guidance application then generates a subscription recommendation for the upcoming time period. The media guidance application generates the subscription recommendation according to the following process. The media guidance application selects the first subscription and compares the first viewing impact to the available amount of time. For example, the media guidance application selects the HBO subscription as a subscription it will recommend the subscriber maintains. The media guidance application then compares the amount of time available to consume media, perhaps 285 minutes in July and August, with the viewing impact of the upcoming seasons of Game of Thrones in July and August, perhaps 445 minutes. In response to determining that the first viewing impact is less than the available amount of time, the media guidance application selects the second subscription and compares a sum of the first viewing impact and the second viewing impact to the available amount of time. For example, the media guidance application selects the Netflix subscription as a subscription it will recommend the subscriber maintains. The media guidance application also compares the total viewing impact of Game and Thrones (445 minutes) and Mindhunter (0 minutes) for the months of July and August, 445 minutes total, with the available amount of time for viewing media content, 285 minutes in this example. The media guidance application determines whether the sum of the viewing impacts exceeds the available amount of time.

If the sum of the viewing impacts exceeds the available amount of time, the media guidance application selects the first subscription and does not select the second subscription. In other words, the media guidance application changes its recommendation to recommend that the subscriber cancels the Netflix subscription as the subscription is inefficient because the subscriber will not have time to consume media from Netflix based on the predictions made by the media guidance application. In another example, the media guidance application may determine that the subscriber should cancel a subscription because the viewing impact associated with that subscription is zero for the relevant time period.

In some embodiments, the media guidance application may predict that a show that hadn't been watched previously by a user is correlated with the user's viewing history and viewing preferences. For example, the media guidance application may determine that other users with similar preferences are watching a newly released show that is likely to be watched by the user. As such, the media guidance application may allocate a viewing impact for content not previously watched. The viewing impact of that content may also be considered in making subscription recommendations and, as discussed later, content purchase recommendations.

As used herein, media content subscriptions may encompass many forms of content subscription. For example, a subscriber may subscribe to television programming services, e.g., services provided by companies like Comcast™ Verizon™ DirecTV™, or Dish Network™. At the same time, a subscriber may subscribe to premium packages within a television programming service such as HBO™ or Showtime™. In recent years, online streaming services, e.g., HBO Now™, Netflix™, and Amazon Prime™ Video, have become popular with media consumers and the subscriber may subscribe to such services. Media content subscriptions may also encompass spot subscriptions, such as pay-per-view events, pay-per-view movies, or video on demand.

While the embodiments herein are described primarily with reference to media content subscriptions. One of skill in the art would recognize that these techniques could be applied to other content as well. For example, a user may purchase television, movie, or audio programs outside of a subscription model. For example, movies, television shows, and audiobooks are regularly released by content providers for purchase through programs such as iTunes, a registered trademark of Apple, and Amazon. The media guidance application may consider the user's past purchases and predict upcoming purchases and use the viewing impact of those purchases in making subscription recommendations in a similar manner as done for a user's content subscriptions. Therefore, the media guidance application may determine that the user has purchased, or is likely to purchase, 200 minutes of content for an upcoming time period. When determining subscription recommendations for that time period, the media guidance application may use the viewing impact of the purchased content to make the subscription recommendations. Furthermore, the media guidance application may make content purchase recommendations and automate content purchases in similar manner to making subscription recommendations. For example, the media guidance application may determine that, based on the user's viewing history or input from the user, the user is should purchase a movie that will be released in the upcoming time period on iTunes. The media guidance application may allocate a portion of the user's media consumption budget to the purchase of the movie and calculate a viewing impact associated with the movie, e.g., 120 minutes. The media guidance application can use this information to recommend a content purchase to the user and to influence the subscription recommendations the media guidance application will make. In some embodiments, the media guidance application can automate the purchase of the content and ensure the content is available for viewing on the user's devices once the content is released.

In some embodiments, the media guidance application predicts the first viewing impact of the first subscription for the upcoming time period based on the amount of time that a subscriber spent viewing content in the first subscription. The media guidance application identifies a set of viewed media assets associated with the first media package that the subscriber previously viewed. The media guidance application identifies the set of viewed media assets so that each media asset in the set of viewed media assets is related to the other media assets in the set of viewed media assets based on one or more characteristics associated with the set of viewed media assets. For example, using the viewing patterns of the subscriber, the media guidance application may identify that the subscriber previously watched four episodes of Game of Thrones associated with a subscription to HBO. The media guidance application determines a total run time of the set of viewed media assets. For example, the media guidance application may determine that the run time of the four Game of Thrones episodes was 200 minutes. The media guidance application determines a viewed run time associated with the subscriber and the set of viewed media assets. Continuing the example, the media guidance application may determine that the subscriber didn't watch all of the run time of the four episodes; instead the subscriber only watched 160 minutes out of the 200 total minutes. The media guidance application determines an upcoming run time of media assets related to the first media package of interest that also share one or more of the characteristics associated with the set of viewed media assets. For example, the media guidance application may determine that the new season of Game of Thrones contains 445 minutes of run time. The media guidance application determines the first viewing impact of the first subscription based on the total run time, the viewed run time, and upcoming run time. For example, the media guidance application determines that the subscriber previously watched 80% of the run time of the Game of Thrones episodes they started. The media guidance application may, therefore, determine that the first viewing impact should only account for 80% of the upcoming run time, or 356 minutes, based on the subscriber's viewing history.

In some embodiments, the media guidance application provides an interface that allows the subscriber to configure the amount of time the media guidance application assumes the subscriber will spend watching media content. The media guidance application generates, for display in a media guidance application, a subscription management interface. For example, the media guidance application may present subscriber interface screens that comprise textual representation of options for configuration. The media guidance application may generate textboxes, sliders, numerical input boxes, combination text-icon input, wheels, or other input elements appropriate for receiving input from the subscriber. The media guidance application obtains, from the subscriber, a time budget input. The time budget input representative of the amount of time the media guidance application should use for the amount of media content the subscriber can consume when determining whether the subscriber is over-subscribed to media content subscriptions. The media guidance application adjusts the available amount of time based on the time budget input.

In some embodiments, the media guidance application modifies the subscriber's subscriptions to media content subscriptions. In these embodiments, the media guidance application responds to selecting the first subscription and not selecting the second subscription by generating a subscription modification message associated with the second subscription. The media guidance application transmits the subscription modification message to a subscription management server. For example, the media guidance application generates the subscription modification message to indicate the second subscription should be cancelled and transmits the subscription modification message to a server associated with the second subscription. It may be that the media guidance application determined that Netflix should be cancelled for the upcoming time period. Therefore, the media guidance application generates a message to send to Netflix's servers that tells Netflix to cancel the subscriber's subscription to Netflix. For example, the media guidance application may contact a web service using JavaScript Object Notation (JSON) formatted requests to send to a subscription management server. The media guidance application also generates, for display to the subscriber, a notification indicating the subscription modification message was transmitted to the subscription management server.

In some embodiments, the subscriber can confirm or reject the recommendations made by the media guidance application. When the media guidance application determines that a subscription should be cancelled, it presents the option to the subscriber with an appropriate input to confirm the recommendation. The media guidance application generates, for display to a subscriber, a subscription modification confirmation based on not selecting the second subscription. The media guidance application receives, from a subscriber, input indicating whether to cancel the second subscription. If the subscriber confirms the recommendation, the media guidance application leaves the second subscription unselected. If the subscriber rejects the recommendation, the media guidance application changes the selection state of the second subscription by selecting the second subscription.

In some embodiments, the media guidance application also bases subscription recommendations on whether media content will become available at a later time. The media guidance application determines whether the media content related to the first release schedule will be available during a second time period that is subsequent to the upcoming time period. In response to determining that the media content related to the first release schedule will be available during a second time period, the media guidance application will modify the selection of the first subscription by not selecting the first subscription. For example, the media guidance application may determine that Game of Thrones will be available at a later time on Amazon Prime. And because the subscriber has Amazon Prime for shopping, the media guidance application considers this to be a free, or relatively inexpensive, media content subscription. Therefore, the media guidance application may determine that it will be far more efficient for the subscriber to wait additional time to watch Game of Thrones through Amazon Prime instead of paying for an HBO subscription. In some embodiments, the media guidance application may receive a preference from the subscriber for whether to cancel subscriptions in lieu of later release. In still other embodiments, the media guidance application may analyze the subscriber's viewing patterns to determine whether to cancel the subscription in lieu of a later release of content on another service.

In some embodiments, the media guidance application makes recommendations, based in part on the amount of money the subscriber spends on subscriptions. The media guidance application generates, for display to a subscriber, a subscription management interface. The media guidance application obtains, from the subscriber using the subscription management interface, a subscription resources threshold. For example, the media guidance application may receive a budget from the subscriber for the subscriber's period expenditures on media content subscriptions, e.g., $165/month. The media guidance application determines a first subscription resources impact associated with the first subscription. For example, the media guidance application may determine that HBO costs the subscriber $15/month. The media guidance application determines a second subscription resources impact associated with the second subscription. For example, the media guidance application may determine that Netflix costs the subscriber $10/month. The media guidance application modifies the subscription recommendation based on comparing the first subscription resources impact, the second subscription resources impact, and the subscription resources threshold. For example, the media guidance application may determine that the subscriber's budget for monthly media consumption is $165. The media guidance application may also determine that subscriptions to services beyond HBO and Netflix, perhaps the subscriber's cable and internet bill, account for $155. Thus, the subscriber may have only $10 of remaining budget to allocate between HBO and Netflix in this example. The media guidance application may, therefore, determine that the subscriber does not have resources to maintain the HBO subscription and will determine, instead, to cancel the HBO subscription.

In some embodiments, the media guidance application may optimize entertainment spending for the subscriber. For example, the media guidance application may work with a set entertainment budget (e.g., $100 a month), to optimize spending for purchasing content and content subscriptions. As discussed herein, the media guidance application may track the subscriber's viewing habits to determine what media content the subscriber watches and when. For example, the media guidance application may determine that the subscriber watches Game of Thrones on HBO and doesn't watch any other shows on HBO. The media guidance application may recommend subscribing to HBO during the time period when new episodes of Game of Thrones are released and recommend cancelling the HBO subscription during other times. The media guidance application may also add and cancel subscriptions based on the currently available catalogue of content on a certain subscription service. For example, the media guidance application may add Netflix to the subscriber's subscriptions when determining that the subscriber's favorite show is available on Netflix. The media guidance application may also determine whether it is more efficient, from a budget perspective, to buy content (e.g., the full series of Game of Thrones) rather than carry a monthly subscription for content of limited interest to the user.

In some embodiments, the media guidance application may manage the subscriber's content purchases. For example, the media guidance application may determine whether content providers create a spot market for content. For example, content providers may provide dynamic pricing for movies and television shows. The media guidance application may determine that pricing for media content may be lower if the subscriber buys the media content far in advance of the release date (e.g., before any reviews about the content are out). The media guidance application may also determine whether the media content price will be lower if the subscriber buys a season pass versus buying episodes individually.

In some embodiments, the media guidance application may also allow subscribers to sell their own content. For example, the media guidance application may allow the subscribers to sell their Facebook™ live videos, Periscopes™, created content, etc. The media guidance application may create an interface where the subscriber can upload, edit, and release content. The media guidance application may also allow the subscriber to sell advertising space within his/her released content, as well as sell the media content itself.

In some embodiments, the media guidance application may defragment subscriptions and allow multiple subscribers, not within the same household, to share subscriptions. The media guidance application may manage the subscription sharing using a payment application, such as Venmo™. The media guidance application may split up the cost of the subscription evenly between the subscribers sharing the subscription, or may take a more dynamic approach and split up the subscription based on the percentage of use from each subscriber (e.g., a first subscriber watched 90 hours of Netflix for the month, while a second subscriber only watched 10 hours, so the first subscriber may pay 90% of the subscription cost while the second subscriber may pay 10% of the subscription cost).

In some embodiments, the media guidance application may also manage and optimize the entertainment budget for all of the subscriber's entertainment needs (e.g., concerts, plays, etc.).

The media guidance application may also provide a summary of the subscriber's viewing history. For example, the media guidance application may display a pie chart representing the use based on the services and subscriptions that the subscriber used in a previous time period (e.g., a month) of time. The media guidance may also display the cost associated with each service and determine whether the subscriber is efficiently subscribing to services depending on how frequently the subscriber uses the services.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Accordingly, systems and methods for managing a plurality of subscriptions to a plurality of media packages are provided herein. For example, a media guidance application may determine that a subscription period is near completion and that the subscriber will need to make a new payment on the upcoming media content subscription to maintain it. For example, the subscriber's HBO subscription may bill out in 3-days. The media guidance application may then determine whether the subscriber is likely to watch media content associated with the upcoming media content subscription during the next billing cycle. For example, the media guidance application may determine whether new episodes of shows the subscriber has watched in the past are being released in the next month. The media guidance application may also, based on the subscriber's viewing history, determine how much time the subscriber typically spends watching media content in the upcoming period, i.e., in the next billing cycle, and how much of that time the media guidance application predicts the subscriber will spend watching media content outside of the upcoming media content subscription. If the media guidance application predicts that the subscriber will spend a significant amount of time watching content on other subscriptions, for example, the media guidance application may determine that the subscriber should cancel the upcoming media content subscription for the next billing cycle. In some embodiments, the media guidance application may also transmit a message to a subscription management server to cancel the upcoming media content subscription on behalf of the subscriber.

Figure 1:
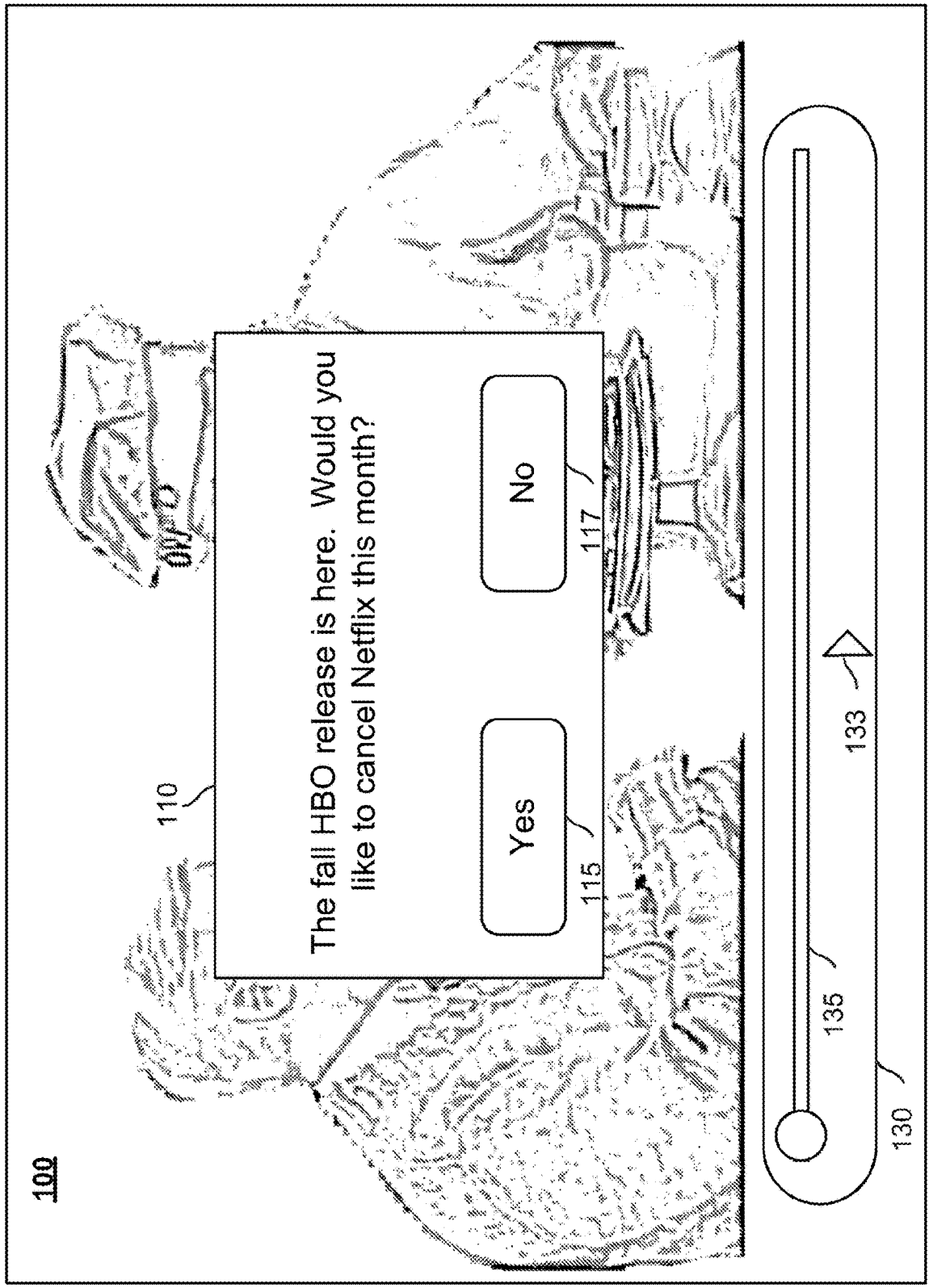
FIG. 1 depicts an illustrative embodiment of a display screen that may be used to manage a plurality of subscriptions to a plurality of media packages in accordance with some embodiments of the disclosure.

FIG. 1 depicts an illustrative embodiment of a display screen that may be used to manage a plurality of subscriptions to a plurality of media packages in accordance with some embodiments of the disclosure. FIG. 1 depicts a media guidance application 100 which may be implemented on user equipment by control circuitry. The functionality of user equipment, control circuitry, and the media guidance application is described in further detail with respect to FIGS. 4-7.

In FIG. 1, the media guidance application 100 is generating playback of a media asset. For example, the media guidance application 100 may be showing an episode of Mr. Roger's Neighborhood. The media guidance application 100 may generate a subscription recommendation including a recommendation that the subscriber cancel a media content subscription. For example, the media guidance application 100 obtains viewing patterns of a subscriber that has a plurality of subscriptions to media content, i.e., media content subscriptions. The media guidance application 100 may receive a listing of dates, times, channels, program metadata, ratings information, duration of viewing, channel change indications, or other data associated with a subscriber's consumption of media content. In a multi-subscriber home, the media guidance application 100 may obtain view patterns for each subscriber in the home as a single collection of patterns per subscriber or a combined collection of patterns for all users.

The media guidance application 100 determines, based on the viewing patterns of the subscriber, a first media package of interest to the subscriber from the plurality of media packages. The first media package of interest is related to a first subscription. For example, the media guidance application 100 may receive viewing patterns that indicate that a subscriber is subscribed to HBO, a premium television package. From the viewing patterns, the media guidance application 100 may determine that a subscriber watches the HBO program Game of Thrones™, an episodic show released through HBO's premium service. The media guidance application 100 may further determine that the subscriber watches Game of Thrones episodes as soon as a new episode is released on HBO. In this example, Game of Thrones is a media package of interest related to the HBO subscription based on the subscriber's viewing patterns.

In some embodiments, the media guidance application 100 determines the first media package of interest to the subscriber from a plurality of media packages using the total viewing time of a subscription and viewing time associated with a candidate media package. For example, the media guidance application 100 may determine that the subscriber subscribes to HBO and HBO is releasing a new season of Game of Thrones and a new season of Westworld™. Both Game of Thrones and Westworld are media packages related to a first subscription, HBO. The media guidance application 100 determines a total viewing time associated with the subscriber and the plurality of media packages based on the viewing patterns of the subscriber. For example, the media guidance application 100 may determine that the subscriber historically spends approximately 300 minutes viewing HBO shows in July and August. The media guidance application 100 determines a candidate media package from the plurality of media packages. For example, the media guidance application 100 may determine that Game of Thrones is a potential media package of interest because the subscriber historically watches Game of Thrones during the upcoming time period, perhaps July and August. The media guidance application 100 determines a candidate media package viewing time associated with the subscriber and the candidate media package. Continuing the example, the media guidance application 100 may determine that the upcoming run time of Game of Thrones for July and August is 445 minutes. The media guidance application 100 identifies the candidate media package as the first media package of interest based on a comparison of the total viewing time and the first package viewing time. For example, the media guidance application 100 may determine that Game of Thrones is an important media package from the HBO subscription because its run time accounts for a large amount of time in comparison to the subscriber's historical consumption of HBO for the same time period.

The media guidance application 100 continues by determining, based on the viewing patterns of the subscriber, a second media package of interest to the subscriber from the plurality of media packages, the second media package of interest related to a second subscription. For example, the media guidance application 100 may determine that a subscriber is subscribed to Netflix, an online streamlining service. From the subscriber's viewing history, the media guidance application 100 may determine that the subscriber watches episodes of Mindhunter™, an episodic show released through Netflix's service. In this example, the media guidance application 100 may determine that the subscriber watched an entire season of Mindhunter in one sitting, a behavior sometimes referred to as binge watching. Based on this viewing pattern, the media guidance application 100 may determine that Mindhunter is a media package of interest related to the Netflix subscription. For example, the media guidance application 100 may determine the second media package of interest to the subscriber based on the total viewing time of a subscription and viewing time associated with a candidate media package.

The media guidance application 100 obtains a first release schedule related to media content in the first media package to be released in an upcoming time period. Carrying through with the example above, new seasons of Game of Thrones were historically released during the summer months. In this example, the media guidance application 100 may obtain a schedule of new episodes of Game of Thrones from an upcoming season that will be released in the summer. The media guidance application 100 also obtains a second release schedule related to media content in the second media package to be released in the upcoming time period. In this case, the media guidance application 100 may determine that a new season of Mindhunter will be released all at once in the fall, perhaps October.

The media guidance application 100 predicts, using the first release schedule and the viewing patterns of the subscriber, a first viewing impact of the first subscription for the upcoming time period. The media guidance application 100 predicts the first viewing impact to indicate a total predicted amount of time that a subscriber will spend viewing the first media package in the upcoming time period. For example, the media guidance application 100 may determine that the upcoming season of Game of Thrones will run 445 minutes and, based on the fact that the subscriber's viewing history indicates the subscriber watches the entirety of each Game of Thrones episode, the media guidance application 100 predicts the subscriber will watch the entirety of each new episode of Game of Thrones as it is released in July and August. Therefore, the media guidance application 100 predicts that the viewing impact of Game of Thrones will be 445 minutes in the July and August time period. In other examples, the media guidance application 100 may predict the impact of the media package at different granularities. For example, the media guidance application 100 predicts the viewing impact on daily, weekly, monthly, seasonally, or yearly basis. The media guidance application 100 may also determine viewing impact based on a subscription period related to the corresponding media content subscription. For example, the media guidance application 100 may determine that the subscriber is billed for HBO every month on the ninth, and determine the viewing impact associated with an upcoming release of Game of Thrones between July 9th and August 9th.

The media guidance application 100 predicts, using the second release schedule and the viewing patterns of the subscriber, a second viewing impact of the second subscription for the upcoming time period. The media guidance application 100 predicts the second viewing impact to indicate a total predicted amount of time spent viewing the second media package in the upcoming time period. Continuing the prior example, the media guidance application 100 may predict that the subscriber will consume all of Mindhunter on the day the new season is released, perhaps October 10th. Therefore, the media guidance application 100 predicts the viewing impact of Mindhunter on October 10th will be, for example, 325 minutes. But the media guidance application 100 also determines that the viewing impact of Mindhunter outside of October 10th will be nothing.

The media guidance application 100 determines an available amount of time for viewing media in the upcoming time period. For example, the media guidance application 100 may determine that a subscriber spends 100 minutes each month viewing media content across all services. And if the upcoming time period is July and August, then the media guidance application 100 may determine that the available amount of time for viewing media is 200 minutes. In other examples, the media guidance application 100 may use historical viewing patterns to more accurately determine the available amount of time. For example, the media guidance application 100 may analyze the subscriber's viewing patterns and determine that, historically, the subscriber consumes 165 minutes of content in July and 120 minutes of content in August. In that example, the available amount of time for viewing media content in July and August is 285 minutes.

The media guidance application 100 then generates a subscription recommendation for the upcoming time period. The media guidance application 100 generates the subscription recommendation according to the following process. The media guidance application 100 selects the first subscription and compares the first viewing impact to the available amount of time. For example, the media guidance application 100 selects the HBO subscription as a subscription it will recommend the subscriber maintains. The media guidance application 100 then compares the amount of time available to consume media, perhaps to 285 minutes in July and August, with the viewing impact of the upcoming seasons of Game of Thrones in July and August, perhaps 445 minutes. In response to determining that the first viewing impact is less than the available amount of time, the media guidance application 100 selects the second subscription and compares a sum of the first viewing impact and the second viewing impact to the available amount of time. For example, the media guidance application 100 selects the Netflix subscription as a subscription it will recommend the subscriber maintains. The media guidance application 100 also compares the total viewing impact of Game and Thrones (445 minutes) and Mindhunter (0 minutes) for the months of July and August, 445 minutes total, with the available amount of time for viewing media content, 285 minutes in this example. The media guidance application 100 determines whether the sum of the viewing impacts exceeds the available amount of time. If the sum of the viewing impacts exceeds the available amount of time, the media guidance application 100 selects the first subscription and does not select the second subscription. In other words, the media guidance application 100 changes its recommendation to recommend that the subscriber cancels the Netflix subscription as the subscription is inefficient because the subscriber will not have time to consume media from Netflix based on the predictions made by media guidance application 100. In another example, the media guidance application 100 may determine that the subscriber should cancel a subscription because the viewing impact associated with that subscription is zero for the relevant time period.

As used herein, media content subscriptions may encompass many forms of content subscription. For example, a subscriber may subscribe to television programming services, e.g., services provided by companies like Comcast™ Verizon™, DirecTV™, or Dish Network™. At the same time, a subscriber may subscribe to premium packages within a television programming service such as HBO™ or Showtime™. In recent years, online streaming services, e.g., HBO Now™, Netflix™, and Amazon Prime™ Video, have become popular with media consumers and the subscriber may subscribe to such services. Media content subscriptions may also encompass spot subscriptions, such as pay-per-view events, pay-per-view movies, or video on demand.

In some embodiments, the media guidance application 100 predicts the first viewing impact of the first subscription for the upcoming time period based on the amount of time that a subscriber spent viewing content in the first subscription. The media guidance application 100 identifies a set of viewed media assets associated with the first media package that the subscriber previously viewed. The media guidance application 100 identifies the set of viewed media assets so that each media asset in the set of viewed media assets is related to the other media assets in the set of viewed media assets based on one or more characteristics associated with the set of viewed media assets. For example, using the viewing patterns of the subscriber, the media guidance application 100 may identify that the subscriber previously watched four episodes of Game of Thrones associated with a subscription to HBO. The media guidance application 100 determines a total run time of the set of viewed media assets. For example, the media guidance application 100 may determine that the run time of the four Game of Thrones episodes was 200 minutes. The media guidance application 100 determines a viewed run time associated with the subscriber and the set of viewed media assets. Continuing the example, the media guidance application 100 may determine that the subscriber didn't watch all of the run time of the four episodes, instead the subscriber only watched 160 minutes out of the 200 total minutes. The media guidance application 100 determines an upcoming run time of media assets related to the first media package of interest that also share one or more of the characteristics associated with the set of viewed media assets. For example, the media guidance application 100 may determine that the new season of Game of Thrones contains 445 minutes of run time. The media guidance application 100 determines the first viewing impact of the first subscription based on the total run time, the viewed run time, and upcoming run time. For example, the media guidance application 100 determines that the subscriber previously watched 80% of the run time of the Game of Thrones episodes they started. The media guidance application 100 may, therefore, determine that the first viewing impact should only account for 80% of the upcoming run time, or 356 minutes, based on the subscriber's viewing history.

In some embodiments, the media guidance application 100 provides an interface that allows the subscriber to input media packages of interest. For example, the media guidance application 100 may be unable to detect media packages of interest based on viewing history or the media guidance application 100 may not have access to viewing history because the user is new to the system. In some embodiments, the user may want to supplement the media guidance application 100 determination of media packages of interest. Therefore, the media guidance application 100 may provide a user interface that allows a user to input the names of media packages, shows, series, movies, and other content of interest to be treated similarly to media packages of interest determined by the media guidance application 100. Similarly, the media guidance application 100 may provide user interface elements that allow the user to provide priority values, e.g., numerical values representing the importance of content to the user, to media packages of interest and manually input content. The media guidance application 100 may use the priority values when making subscription recommendations. For example, media guidance application 100 may initially determine that a subscription to HBO should be maintained and a subscription to Netflix should be cancelled. But the media guidance application 100 may also determine that the user has given priority values to content in the Netflix subscription that are higher than priority values for content in the HBO subscription. Based on the priority values, the media guidance application 100 may recommend that the HBO subscription is cancelled and the Netflix subscription is maintained.

In some embodiments, the media guidance application 100 provides detailed information of the value of the user's content subscriptions and purchases. The media guidance application 100 may rank the relative values of all existing media subscriptions as a pie chart of total viewing hours in a month/year. For example, the media guidance application 100 may use the user's viewing history to determine the user consumed 4000 minutes of content in the year; 3000 minutes from Netflix, 400 minutes from HBO, and 600 minutes from movie purchases. The media guidance application may present a pie chart of the user's viewing habits to visualize this consumption. The media guidance application 100 may also combine viewing time with the percentage of entertainment costs to make a value determination. For example, if the user spends $15/month ($180/year) and only watches new episodes of Game of Thrones which account for 400 minutes of the user's yearly media consumption, then the media guidance application may determine the user spends $0.45/minute on HBO. The media guidance application 100 may also determine the user spends $10/month on Netflix and watches a total of 3000 minutes across different content on Netflix, e.g. movies and series. Therefore, the media guidance application 100 may determine a perceived value for Netflix of $0.04/minute. Thus, Netflix is a greater value per dollar spent in this example. In some embodiments, the media guidance application 100 may track the perceived value of various subscriptions overtime and provide information to the user demonstrating the change of value over time, e.g., a line graph of value across different time periods. Therefore, the media guidance application 100 provides the user with unparalleled visibility into the amount of time the user spends consuming along with the value the user receives from various content subscriptions and purchases.

In some embodiments, the media guidance application 100 provides an interface that allows the subscriber to configure the amount of time the media guidance application 100 assumes the subscriber will spend watching media content. The media guidance application 100 generates, for display in a media guidance application, a subscription management interface. For example, the media guidance application 100 may present subscriber interface screens that comprise textual representation of options for configuration. The media guidance application 100 may generate textboxes, sliders, numerical input boxes, combination text-icon input, wheels, or other input elements appropriate for receiving input from the subscriber. The media guidance application 100 obtains, from the subscriber, a time budget input. The time budget input representative of the amount of time the media guidance application 100 should use for how much media content the subscriber can consume when determining whether the subscriber is over-subscribed to media content subscriptions. The media guidance application 100 adjusts the available amount of time based on the time budget input.

Figure 2:
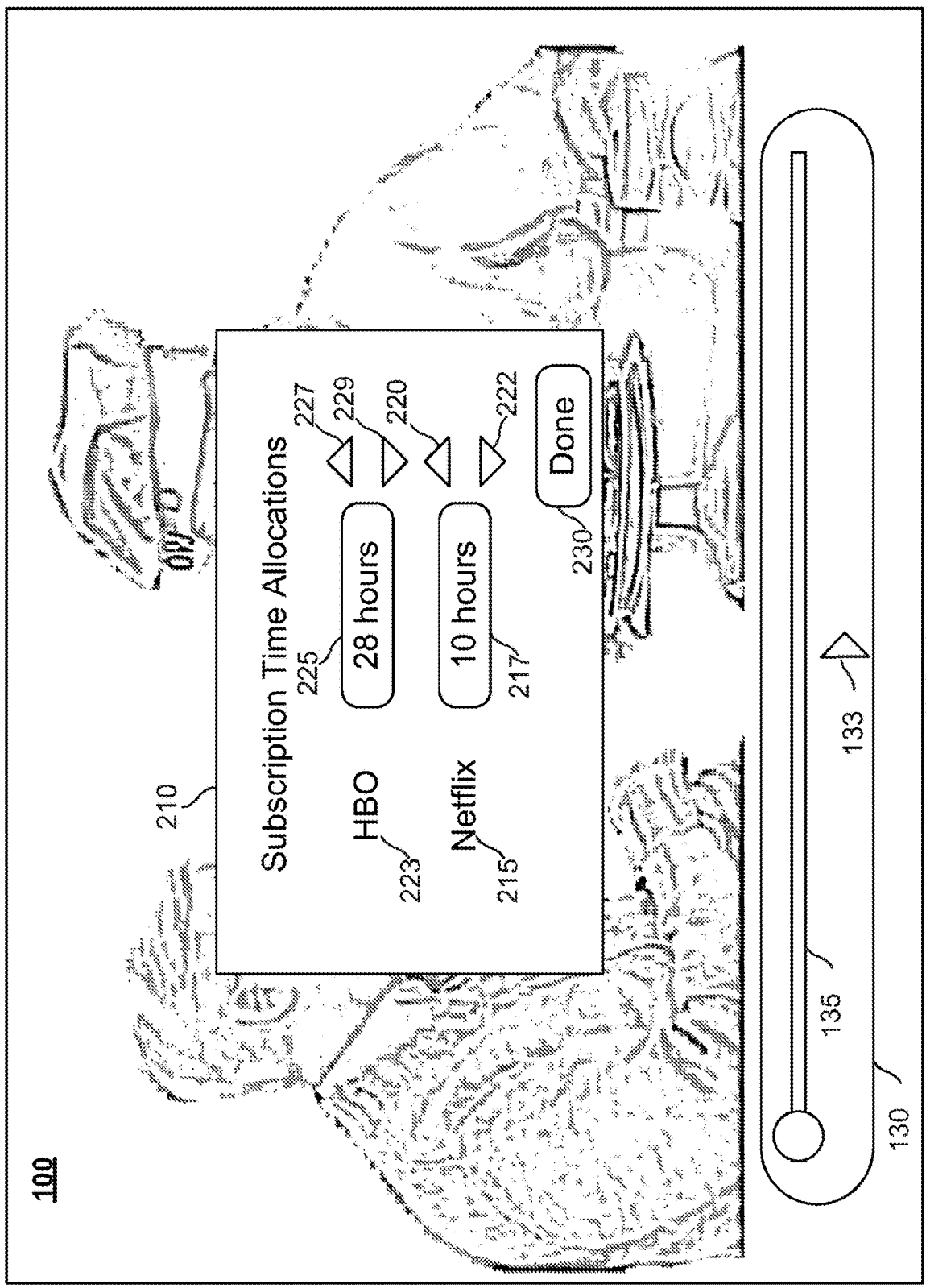
FIG. 2 depicts an illustrative embodiment of a display screen that may be used to manage subscription time allocations in accordance with some embodiments of the disclosure.

FIG. 2 depicts an illustrative embodiment of a display screen that may be used to manage subscription time allocations in accordance with some embodiments of the disclosure. In some embodiments, the media guidance application 100 provides a subscription time allocation interface 210 that allows the subscriber to adjust the amount of time the media guidance application 100 predicts the user will spend viewing media content associated with various media content subscriptions. In FIG. 2, for example, the subscription time allocation interface 210 generates a user interface for adjusting the predicted viewing time associated with HBO and Netflix. In some embodiments, such as shown in FIG. 2, the media guidance application 100 generates several user interface elements for each media content subscription: an information label, a predicted time input element, a time allocation increase element, and a time allocation decrease element. In FIG. 2, the subscriber's Netflix subscription is associated with informational label 215, a predicted time input element 217, a time allocation increase element 220 and a time allocation decrease element 222. The subscriber's HBO subscription is associated with informational label 223, a predicted time input element 225, a time allocation increase element 227 and a time allocation decrease element 229. The media guidance application 100 also generates a complete input element 230. During the prediction of the viewing impact of a subscription, the media guidance application 100 may adjust the predicted viewing impact of the subscription based on the predicted time input element associated with that subscription in the subscription time allocation interface 210.

Returning to FIG. 1, in some embodiments, the media guidance application 100 modifies the subscriber's subscriptions to media content subscriptions. In these embodiments, the media guidance application 100 responds to selecting the first subscription and not selecting the second subscription by generating a subscription modification message associated with the second subscription. The media guidance application 100 transmits the subscription modification message to a subscription management server. For example, the media guidance application 100 generates the subscription modification message to indicate the second subscription should be cancelled and transmits the subscription modification message to a server associated with the second subscription. It may be that the media guidance application 100 determined that Netflix should be cancelled for the upcoming time period. Therefore, the media guidance application 100 generates a message to send to Netflix's servers that tells Netflix to cancel the subscriber's subscription to Netflix. For example, the media guidance application may contact a web service using JavaScript Object Notation (JSON) formatted requests to send to a subscription management server. The media guidance application 100 also generates, for display to the subscriber, a notification indicating the subscription modification message was transmitted to the subscription management server.

In some embodiments, the subscriber can confirm or reject the recommendations made by the media guidance application 100. When the media guidance application 100 determines that a subscription should be cancelled, it presents the option to the subscriber with an appropriate input to confirm the recommendation. The media guidance application 100 generates, for display to a subscriber, a subscription modification confirmation based on not selecting the second subscription.

For example, the media guidance application 100 may generate information screen 110 for display to the subscriber. Information screen 110 contains information that informs the subscriber that the media guidance application recommends the subscriber cancel the second subscription, e.g., Netflix. The media guidance application generates input elements that allow a user to accept the recommendation, input button 115, and allow a user to decline the recommendation, input button 117. In some embodiments, the media guidance application 100 monitors the subscriber's interactions with the system to determine when to generate information screen 110. For example, the media guidance application 100 may detect that a commercial is being displayed to a subscriber and generate information screen 110 during the commercial. Or the media guidance application 100 may detect when the subscriber pauses playback of a media asset and generate the information screen 100 during the pause. In other embodiments, the media guidance application 100 generates the information screen 110 in response to the subscriber invoking a subscription management option from a menu system generated by the media guidance application 100.

In some embodiments, the media guidance application 100 provides additional details regarding a user's subscriptions and content purchases. For example, the media guidance application 100 may indicate, in information screen 110, that the user can spend 80% of his predicted viewing time watching content in HBO for a cost of $15 for the month. The media guidance application 100 may also indicate that, based on current budget constraints, that choice would require the user forego his Netflix subscription, at a cost of $10 for the month, and that the Netflix could account for 70% of his predicted viewing time for the month. In some embodiments, the media guidance application 100 may further call out programming specific to the relevant content subscriptions. For example, the media guidance application 100 may indicated that the user will have access to Game of Thrones via the recommended HBO subscription and the user will have to forego new episodes of Netflix's Mindhunter for the month. After presenting this information, the media guidance application 100 may provide fine grain control of each subscription including allowing the user to override the subscription recommendations by, for example, choosing to maintain (i.e., keep active) subscriptions to all media content.

The media guidance application 100 receives, from a subscriber, input indicating whether to cancel the second subscription. If the subscriber confirms the recommendation, e.g., by clicking input button 115, the media guidance application 100 leaves the second subscription unselected. If the subscriber rejects the recommendation, e.g., by clicking input button 117, the media guidance application 100 changes the selection state of the second subscription by selecting the second subscription.

In some embodiments, the media guidance application 100 also bases subscription recommendations on whether media content will become available at a later time. The media guidance application 100 determines whether the media content related to the first release schedule will be available during a second time period that is subsequent to the upcoming time period. In response to determining that the media content related to the first release schedule will be available during a second time period, the media guidance application 100 will modify the selection of the first subscription by not selecting the first subscription. For example, the media guidance application 100 may determine that Game of Thrones will be available at a later time on Amazon Prime. And because the subscriber has Amazon Prime for shopping, the media guidance application 100 considers this to be a free, or relatively inexpensive, media content subscription. Therefore, the media guidance application 100 may determine that it will be far more efficient for the subscriber to wait additional time to watch Game of Thrones through Amazon Prime instead of paying for an HBO subscription. In some embodiments, the media guidance application 100 may receive a preference from the subscriber for whether to cancel subscriptions in lieu of later release. In still other embodiments, the media guidance application 100 may analyze the subscriber's viewing patterns to determine whether to cancel the subscription in lieu of a later release of content on another service.

Figure 3:
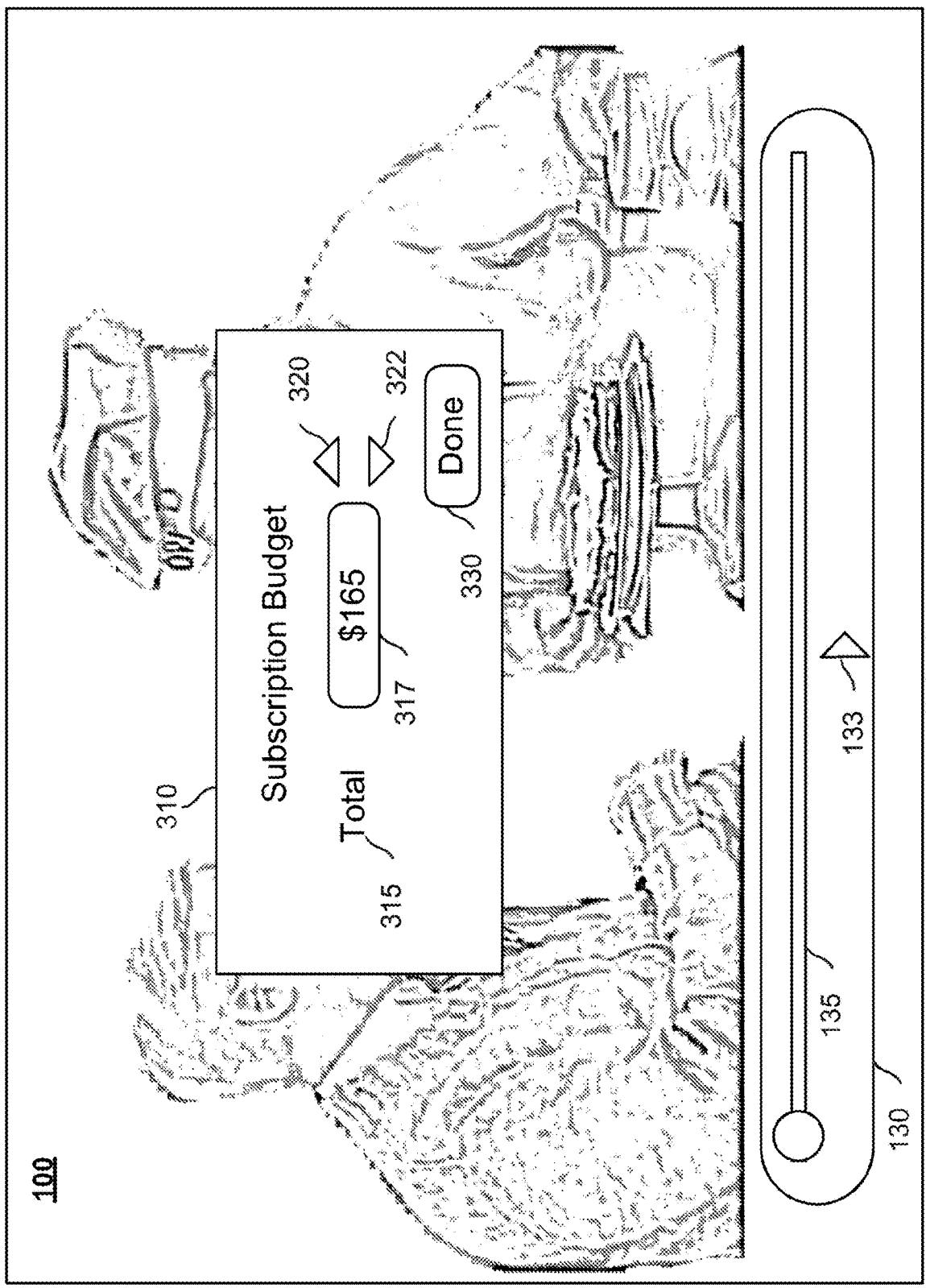
FIG. 3 depicts an illustrative embodiment of a display screen that may be used to manage a subscription budget in accordance with some embodiments of the disclosure.

FIG. 3 depicts an illustrative embodiment of a display screen that may be used to manage a subscription budget in accordance with some embodiments of the disclosure. In some embodiments, the media guidance application 100 makes recommendations, based, in part on the amount of money the subscriber spends on subscriptions. In FIG. 3, the media guidance application 100 generates, for display to a subscriber, a subscription management interface 310. In FIG. 3, the media guidance application generates the subscription management interface 310 along with a subscription resources threshold input element 317 and an informational label 315. In some embodiments, the media guidance application 100 also generates an increase threshold input 320 and a decrease threshold input 322 along with a complete input element 330. Using the input elements, the media guidance application 100 obtains, from the subscriber using the subscription management interface, a subscription resources threshold. For example, the media guidance application 100 may receive a budget from the subscriber for the subscriber's period expenditures on media content subscriptions, e.g., $165/month. The media guidance application 100 determines a first subscription resources impact associated with the first subscription. For example, the media guidance application 100 may determine that HBO costs the subscriber $15/month. The media guidance application 100 determines a second subscription resources impact associated with the second subscription. For example, the media guidance application 100 may determine that Netflix costs the subscriber $10/month. The media guidance application 100 modifies the subscription recommendation based on comparing the first subscription resources impact, the second subscription resources impact, and the subscription resources threshold. For example, the media guidance application 100 may determine that the subscriber's budget for monthly media consumption is $165. The media guidance application 100 may also determine that subscriptions to services beyond HBO and Netflix, perhaps the subscriber's cable and internet bill, account for $155. Thus, the subscriber may have only $10 of remaining budget to allocate between HBO and Netflix in this example. The media guidance application 100 may, therefore, determine that the subscriber does not have resources to maintain the HBO subscription and will determine, instead, to cancel the HBO subscription.

As noted above, the media guidance application described herein controls playback of a media asset, particularly in response to receiving a suspend command close in time to an event from calendar information in a user's profile. The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device,"

"user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 4:
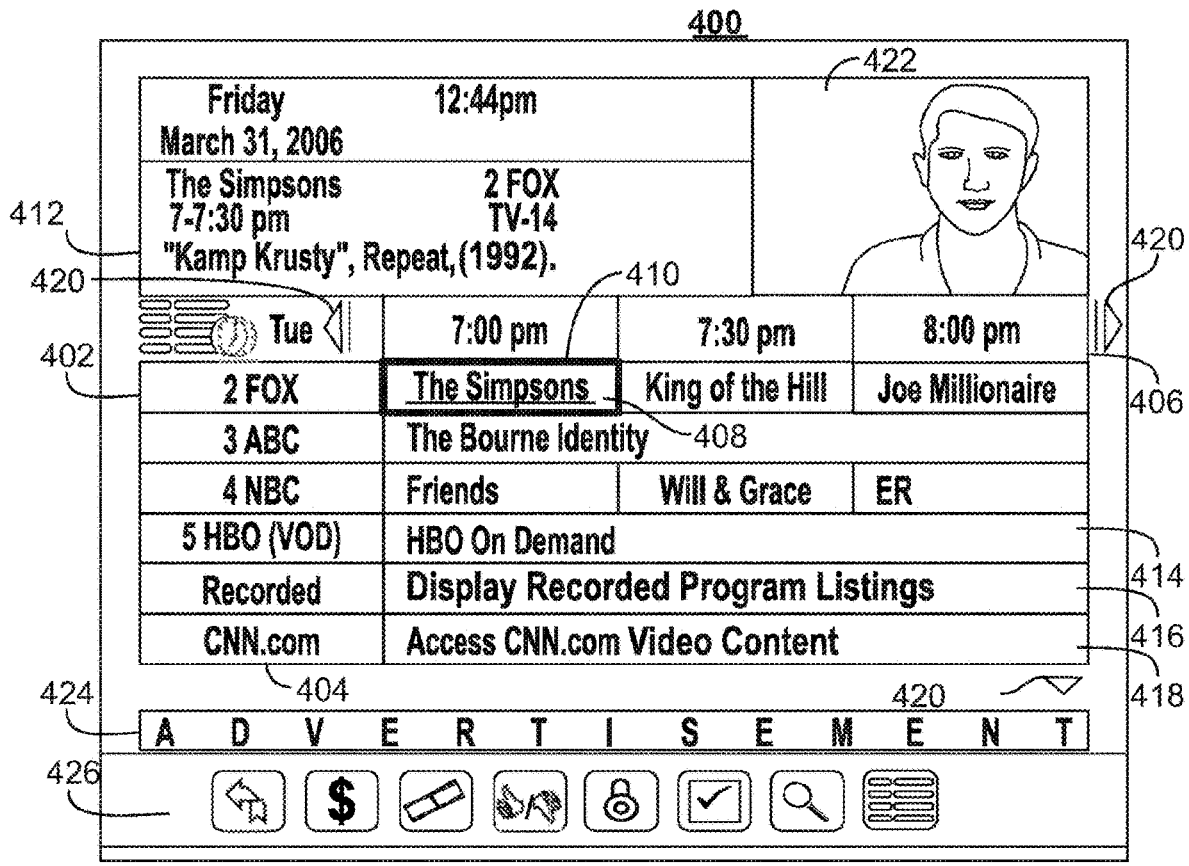
FIG. 4 shows an illustrative embodiment of a display screen that may be used to provide media guidance application listings and other media guidance information, in accordance with some embodiments of the disclosure.
Figure 5:
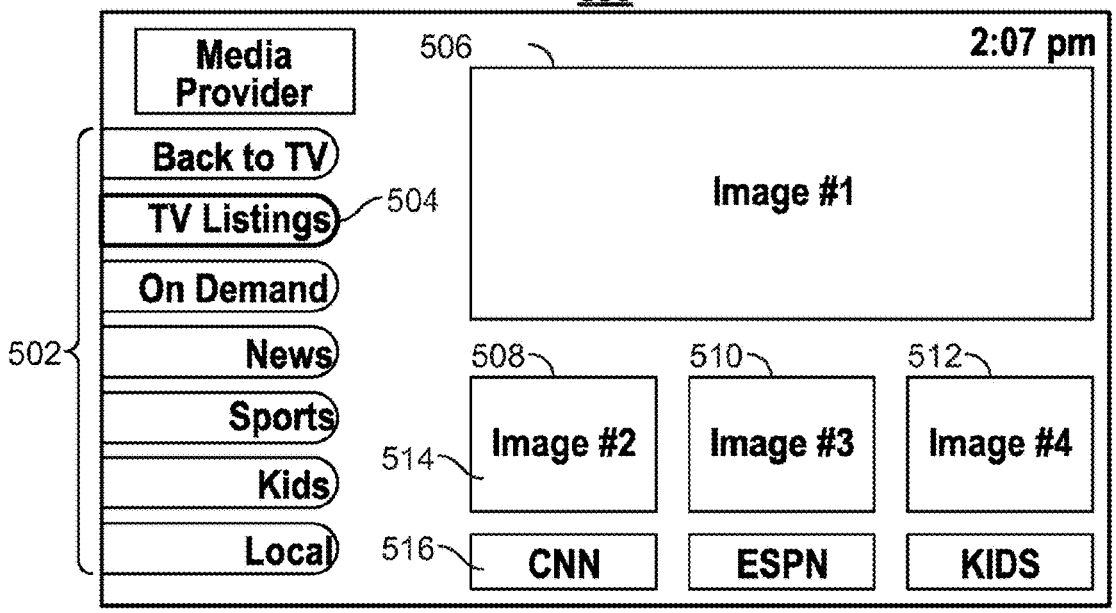
FIG. 5 shows another illustrative embodiment of a display screen that may be used to provide media guidance application listings, in accordance with some embodiments of the disclosure.

FIGS. 4-5 show illustrative display screens that may be used to provide media guidance data. The display screens shown in FIGS. 4-5 may be implemented on any suitable user equipment device or platform. While the displays of FIGS. 4-5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 4 shows illustrative grid of a program listings display 400 arranged by time and channel that also enables access to different types of content in a single display. Display 400 may include grid 402 with: (1) a column of channel/content type identifiers 404, where each channel/content type identifier (which is a cell in the column) identifies a different channel or content type available; and (2) a row of time identifiers 406, where each time identifier (which is a cell in the row) identifies a time block of programming. Grid 402 also includes cells of program listings, such as program listing 408, where each listing provides the title of the program provided on the listing's associated channel and time. With a user input device, a user can select program listings by moving highlight region 410. Information relating to the program listing selected by highlight region 410 may be provided in program information region 412. Region 412 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g., FTP).

Grid 402 may provide media guidance data for non-linear programming including on-demand listing 414, recorded content listing 416, and Internet content listing 418. A display combining media guidance data for content from different types of content sources is sometimes referred to as a "mixed-media" display. Various permutations of the types of media guidance data that may be displayed that are different than display 400 may be based on user selection or guidance application definition (e.g., a display of only recorded and broadcast listings, only on-demand and broadcast listings, etc.). As illustrated, listings 414, 416, and 418 are shown as spanning the entire time block displayed in grid 402 to indicate that selection of these listings may provide access to a display dedicated to on-demand listings, recorded listings, or Internet listings, respectively. In some embodiments, listings for these content types may be included directly in grid 402. Additional media guidance data may be displayed in response to the user selecting one of the navigational icons 420. (Pressing an arrow key on a user input device may affect the display in a similar manner as selecting navigational icons 420.)

Display 400 may also include video region 422, and options region 426. Video region 422 may allow the user to view and/or preview programs that are currently available, will be available, or were available to the user. The content of video region 422 may correspond to, or be independent from, one of the listings displayed in grid 402. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 426 may allow the user to access different types of content, media guidance application displays, and/or media guidance application features. Options region 426 may be part of display 400 (and other display screens described herein), or may be invoked by a user by selecting an on-screen option or pressing a dedicated or assignable button on a user input device. The selectable options within options region 426 may concern features related to program listings in grid 402 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 7. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 5. Video mosaic display 500 includes selectable options 502 for content information organized based on content type, genre, and/or other organization criteria. In display 500, television listings option 504 is selected, thus providing listings 506, 508, 510, and 512 as broadcast program listings. In display 500 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 508 may include more than one portion, including media portion 514 and text portion 516. Media portion 514 and/or text portion 516 may be selectable to view content in full-screen or to view information related to the content displayed in media portion 514 (e.g., to view listings for the channel that the video is displayed on).

The listings in display 500 are of different sizes (i.e., listing 506 is larger than listings 508, 510, and 512), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 6:
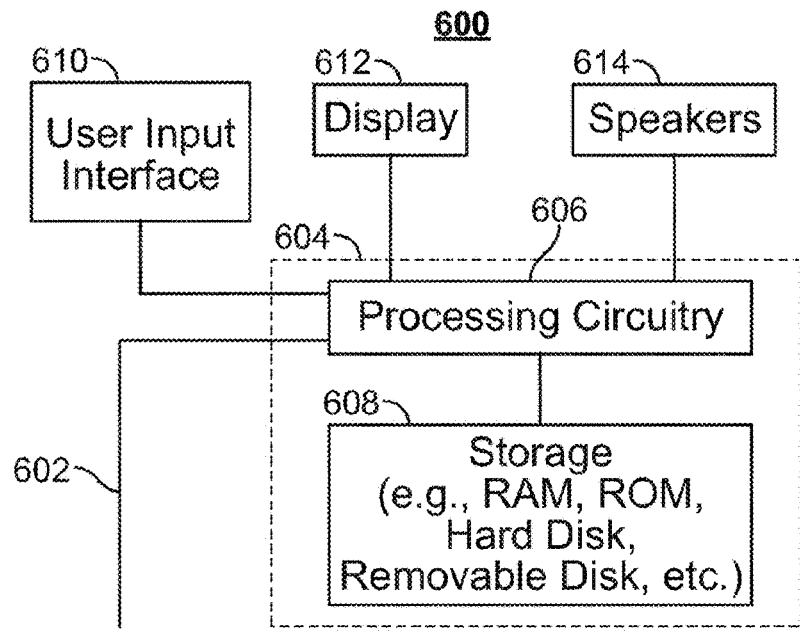
FIG. 6 is a block diagram of an illustrative user equipment (UE) device in accordance with some embodiments of the disclosure.

Users may access content and the media guidance application (and its display screens described above and below) from one or more of their user equipment devices. FIG. 6 shows a generalized embodiment of illustrative user equipment device 600. More specific implementations of user equipment devices are discussed below in connection with FIG. 7. User equipment device 600 may receive content and data via input/output (hereinafter "I/O") path 602. I/O path 602 may provide content (e.g., broadcast programming, on-demand programming, Internet content, content available over a local area network (LAN) or wide area network (WAN), and/or other content) and data to control circuitry 604, which includes processing circuitry 606 and storage 608. Control circuitry 604 may be used to send and receive commands, requests, and other suitable data using I/O path 602. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing.

Control circuitry 604 may be based on any suitable processing circuitry such as processing circuitry 606. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a media guidance application stored in memory (i.e., storage 608). Specifically, control circuitry 604 may be instructed by the media guidance application to perform the functions discussed above and below. For example, the media guidance application may provide instructions to control circuitry 604 to generate the media guidance displays. In some implementations, any action performed by control circuitry 604 may be based on instructions received from the media guidance application.

In client-server based embodiments, control circuitry 604 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as media guidance data described above. Nonvolatile memory may also be used (e.g., to launch a boot-up routine and other instructions). Cloud-based storage, described in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of the user equipment 600. Circuitry 604 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from user equipment 600, the tuning and encoding circuitry (including multiple tuners) may be associated with storage 608.

A user may send instructions to control circuitry 604 using user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of user equipment device 600. For example, display 612 may be a touchscreen or touch-sensitive display. In such circumstances, user input interface 610 may be integrated with or combined with display 612. Display 612 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 612 may be HDTV-capable. In some embodiments, display 612 may be a 3D display, and the interactive media guidance application and any suitable content may be displayed in 3D. A video card or graphics card may generate the output to the display 612. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 604. The video card may be integrated with the control circuitry 604. Speakers 614 may be provided as integrated with other elements of user equipment device 600 or may be stand-alone units. The audio component of videos and other content displayed on display 612 may be played through speakers 614. In some embodiments, the audio may be distributed to a receiver (not shown), which processes and outputs the audio via speakers 614.

The guidance application may be implemented using any suitable architecture. For example, it may be a stand-alone application wholly-implemented on user equipment device 600. In such an approach, instructions of the application are stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to generate any of the displays discussed herein. Based on the processed instructions, control circuitry 604 may determine what action to perform when input is received from input interface 610. For example, movement of a cursor on a display up/down may be indicated by the processed instructions when input interface 610 indicates that an up/down button was selected.

In some embodiments, the media guidance application is a client-server based application. Data for use by a thick or thin client implemented on user equipment device 600 is retrieved on-demand by issuing requests to a server remote to the user equipment device 600. In one example of a client-server based guidance application, control circuitry 604 runs a web browser that interprets web pages provided by a remote server. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on equipment device 600. This way, the processing of the instructions is performed remotely by the server while the resulting displays are provided locally on equipment device 600. Equipment device 600 may receive inputs from the user via input interface 610 and transmit those inputs to the remote server for processing and generating the corresponding displays. For example, equipment device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to equipment device 600 for presentation to the user.

In some embodiments, the media guidance application is downloaded and interpreted or otherwise run by an interpreter or virtual machine (run by control circuitry 604). In some embodiments, the guidance application may be encoded in the ETV Binary Interchange Format (EBIF), received by control circuitry 604 as part of a suitable feed, and interpreted by a user agent running on control circuitry 604. For example, the guidance application may be an EBIF application. In some embodiments, the guidance application may be defined by a series of JAVA-based files that are received and run by a local virtual machine or other suitable middleware executed by control circuitry 604. In some of such embodiments (e.g., those employing MPEG-2 or other digital media encoding schemes), the guidance application may be, for example, encoded and transmitted in an MPEG-2 object carousel with the MPEG audio and video packets of a program.

Figure 7:
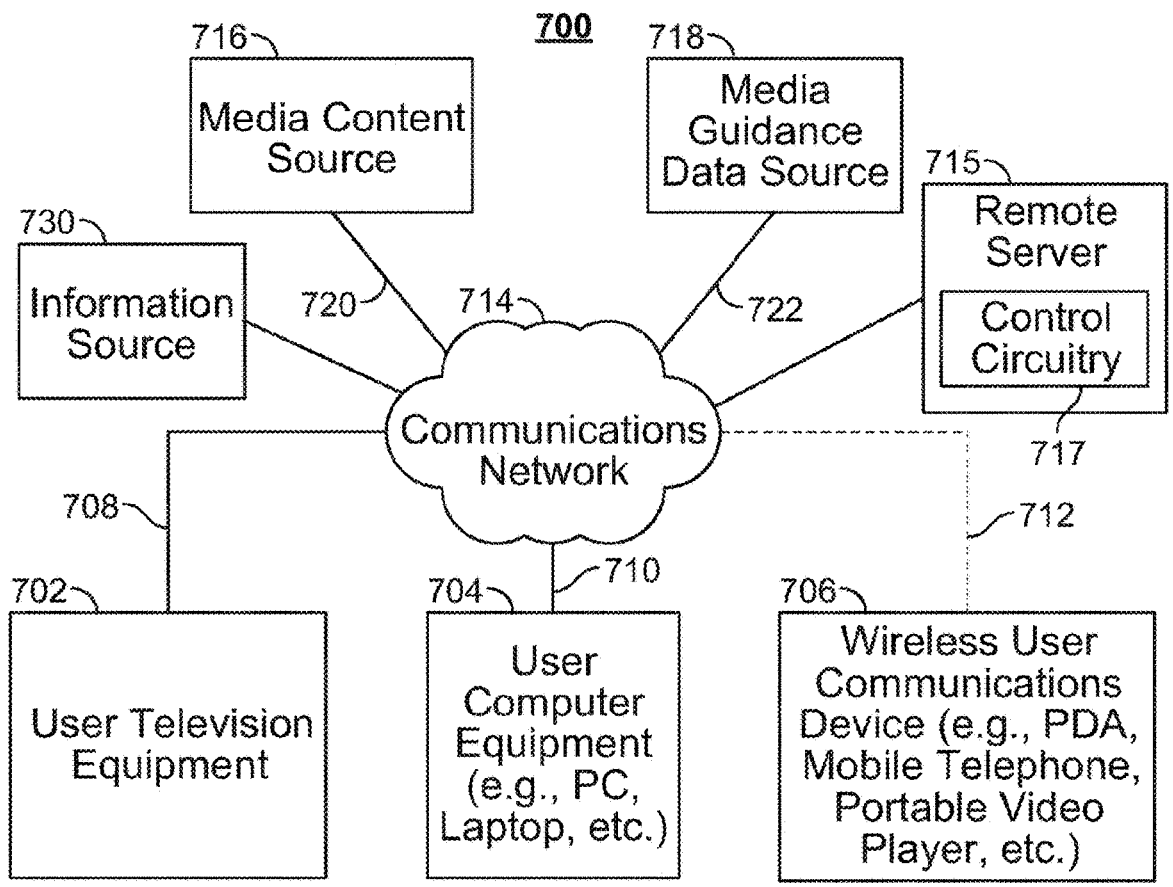
FIG. 7 is a block diagram of an illustrative media system in accordance with some embodiments of the disclosure.

User equipment device 600 of FIG. 6 can be implemented in system 700 of FIG. 7 as user television equipment 702, user computer equipment 704, wireless user communications device 706, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 6 may not be classified solely as user television equipment 702, user computer equipment 704, or a wireless user communications device 706. For example, user television equipment 702 may, like some user computer equipment 704, be Internet-enabled allowing for access to Internet content, while user computer equipment 704 may, like some television equipment 702, include a tuner allowing for access to television programming. The media guidance application may have the same layout on various different types of user equipment or may be tailored to the display capabilities of the user equipment. For example, on user computer equipment 704, the guidance application may be provided as a web site accessed by a web browser. In another example, the guidance application may be scaled down for wireless user communications devices 706.

In system 700, there is typically more than one of each type of user equipment device but only one of each is shown in FIG. 7 to avoid overcomplicating the drawing. In addition, each user may utilize more than one type of user equipment device and also more than one of each type of user equipment device.

In some embodiments, a user equipment device (e.g., user television equipment 702, user computer equipment 704, wireless user communications device 706) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 714. Namely, user television equipment 702, user computer equipment 704, and wireless user communications device 706 are coupled to communications network 714 via communications paths 708, 710, and 712, respectively.

Communications network 714 may be one or more networks including the Internet, a mobile phone network, mobile voice or data network (e.g., a 4G or LTE network), cable network, public switched telephone network, or other types of communications network or combinations of communications networks. Paths 708, 710, and 712 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 712 is drawn with dotted lines to indicate that in the exemplary embodiment shown in FIG. 7 it is a wireless path and paths 708 and 710 are drawn as solid lines to indicate they are wired paths (although these paths may be wireless paths, if desired). Communications with the user equipment devices may be provided by one or more of these communications paths, but are shown as a single path in FIG. 7 to avoid overcomplicating the drawing.

Although communications paths are not drawn between user equipment devices, these devices may communicate directly with each other via communication paths, such as those described above in connection with paths 708, 710, and 712, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 714.

System 700 includes content source 716 and media guidance data source 718 coupled to communications network 714 via communication paths 720 and 722, respectively. Paths 720 and 722 may include any of the communication paths described above in connection with paths 708, 710, and 712. Communications with the content source 716 and media guidance data source 718 may be exchanged over one or more communications paths, but are shown as a single path in FIG. 7 to avoid overcomplicating the drawing. In addition, there may be more than one of each of content source 716 and media guidance data source 718, but only one of each is shown in FIG. 7 to avoid overcomplicating the drawing. (The different types of each of these sources are discussed below.) If desired, content source 716 and media guidance data source 718 may be integrated as one source device. Although communications between sources 716 and 718 with user equipment devices 702, 704, and 706 are shown as through communications network 714, in some embodiments, sources 716 and 718 may communicate directly with user equipment devices 702, 704, and 706 via communication paths (not shown) such as those described above in connection with paths 708, 710, and 712.

Content source 716 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 716 may be the originator of content (e.g., a television broadcaster, a Webcast provider, etc.) or may not be the originator of content (e.g., an on-demand content provider, an Internet provider of content of broadcast programs for downloading, etc.). Content source 716 may include cable sources, satellite providers, on-demand providers, Internet providers, over-the-top content providers, or other providers of content. Content source 716 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 718 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 718 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 718 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 718 may provide user equipment devices 702, 704, and 706 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 608, and executed by control circuitry 604 of a user equipment device 600. In some embodiments, media guidance applications may be client-server applications where only a client application resides on the user equipment device, and server application resides on a remote server. For example, media guidance applications may be implemented partially as a client application on control circuitry 604 of user equipment device 600 and partially on a remote server as a server application (e.g., media guidance data source 718) running on control circuitry of the remote server. When executed by control circuitry of the remote server (such as media guidance data source 718), the media guidance application may instruct the control circuitry to generate the guidance application displays and transmit the generated displays to the user equipment devices. The server application may instruct the control circuitry of the media guidance data source 718 to transmit data for storage on the user equipment. The client application may instruct control circuitry of the receiving user equipment to generate the guidance application displays.

Content and/or media guidance data delivered to user equipment devices 702, 704, and 706 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. YouTube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 700 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 7.

In one approach, user equipment devices may communicate with each other within a home network. User equipment devices can communicate with each other directly via short-range point-to-point communication schemes described above, via indirect paths through a hub or other similar device provided on a home network, or via communications network 714. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 716 to access content. Specifically, within a home, users of user television equipment 702 and user computer equipment 704 may access the media guidance application to navigate among and locate desirable content. Users may also access the media guidance application outside of the home using wireless user communications devices 706 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 714. These cloud resources may include one or more content sources 716 and one or more media guidance data sources 718. In addition or in the alternative, the remote computing sites may include other user equipment devices, such as user television equipment 702, user computer equipment 704, and wireless user communications device 706. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 704 or wireless user communications device 706 having content capture feature. Alternatively, the user can first transfer the content to a user equipment device, such as user computer equipment 704. The user equipment device storing the content uploads the content to the cloud using a data transmission service on communications network 714. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 6.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

It should be noted that process 800 or any step thereof could be performed on, or provided by, any of the devices shown in FIGS. 6-7. For example, process 800 may be executed by control circuitry 604 (FIG. 6) as instructed by a media guidance application implemented on a user device (e.g., user equipment devices 702, 704, and/or 706 (FIG. 7)) in order to manage a plurality of subscriptions to a plurality of media packages. In addition, one or more steps of process 800 may be incorporated into or combined with one or more steps of any other process or embodiment described herein.

Figure 8:
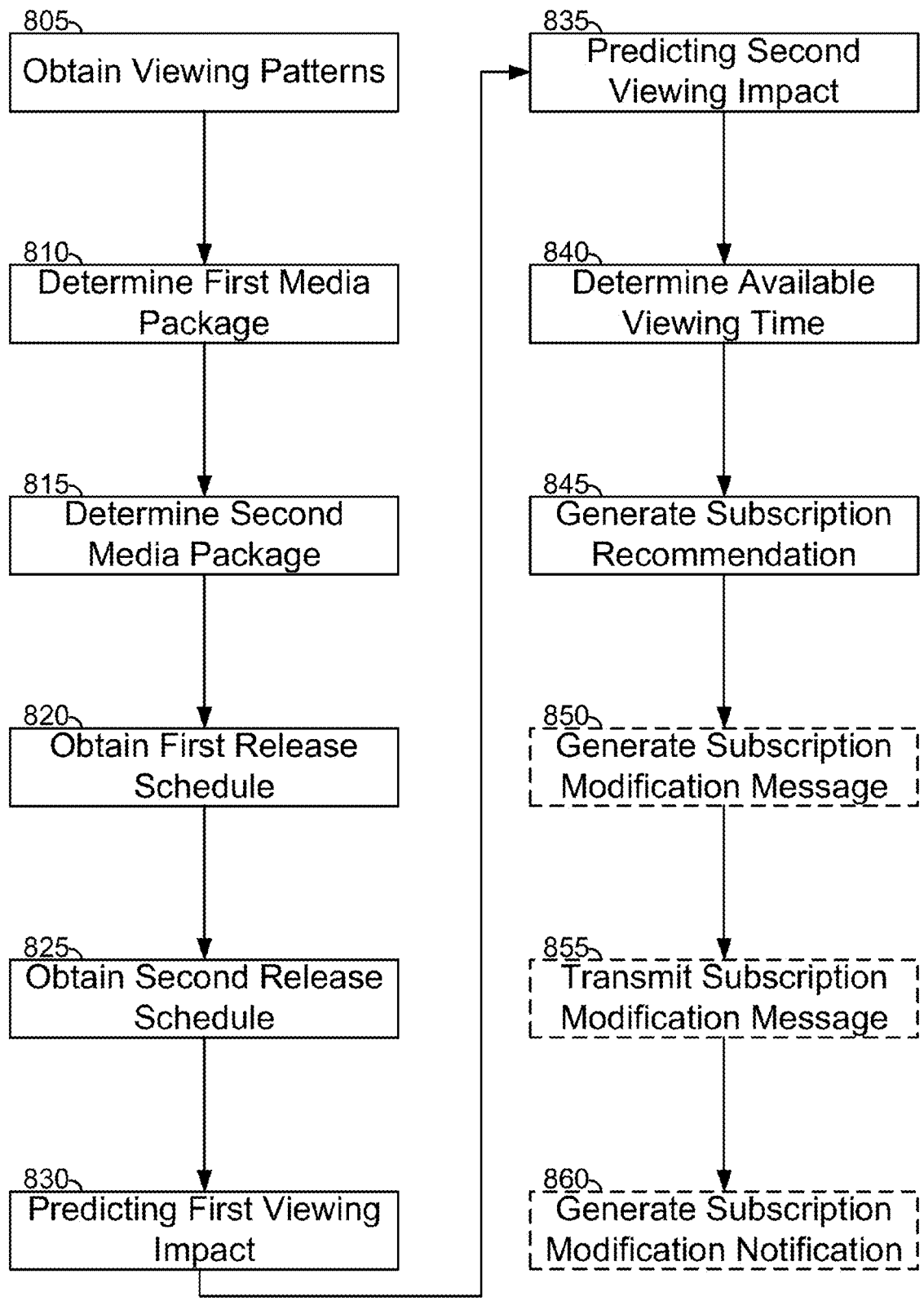
FIG. 8 depicts an illustrative flowchart of a process for managing a plurality of subscriptions to a plurality of media packages, in accordance with some embodiments of the disclosure.

FIG. 8 depicts an illustrative flowchart of a process for managing a plurality of subscriptions to a plurality of media packages, in accordance with some embodiments of the disclosure. Process 800 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 800 begins at 805, where control circuitry 604, using a media guidance application, obtains viewing patterns of a subscriber to the plurality of subscriptions. For example, the control circuitry 604 may receive a listing of dates, times, channels, program metadata, ratings information, duration of viewing, channel change indications, or other data associated with a subscriber's consumption of media content. In a multi-subscriber home, the control circuitry 604 may obtain view patterns for each subscriber in the home as a single collection of patterns per subscriber or a combined collection of patterns for all users.

Process 800 continues to 810, where the control circuitry 604 determines, based on the viewing patterns of the subscriber, a first media package of interest to the subscriber from a plurality of media packages, the first media package of interest related to a first subscription. For example, the control circuitry 604 may receive viewing patterns that indicate that a subscriber is subscribed to HBO, a premium television package. From the viewing patterns, the control circuitry 604 may determine that a subscriber watches the HBO program Game of Thrones™, an episodic show released through HBO's premium service. The control circuitry 604 may further determine that the subscriber watches the Game of Thrones episodes as soon as a new episode is released on HBO. In this example, Game of Thrones is a media package of interest related to the HBO subscription based on the subscriber's viewing patterns. One exemplary embodiment for determining the first media package of interest is described later with reference to FIG. 9. Process 800 continues to 815.

At 815, the control circuitry 604 determines, based on the viewing patterns of the subscriber, a second media package of interest to the subscriber from the plurality of media packages, the second media package of interest related to a second subscription;

obtaining a first release schedule related to media content in the first media package to be released in an upcoming time period. As with 810, the control circuitry 604 may determine the second media package of interest as described with reference to FIG. 9.

Process 800 continues at 820, where the control circuitry 604 obtains a first release schedule related to media content in the first media package to be released in an upcoming time period. At 825, process 800 obtains a second release schedule related to media content in the second media package to be released in the upcoming time period. For example, new seasons of Game of Thrones have been historically released during summer each year. Thus, the control circuitry 604 may obtain a schedule of new episodes of Game of Thrones from an upcoming season that will be released in the summer. The control circuitry 604 may also obtains a second release schedule related to media content in the second media package to be released in the upcoming time period. In this case, the control circuitry 604 may determine that a new season of Mindhunter will be released all at once in the fall, perhaps October, on Netflix.

The control circuitry 604 continues process 800 at 830, where the control circuitry 604 predicts, using the first release schedule and the viewing patterns of the subscriber, a first viewing impact of the first subscription for the upcoming time period, wherein the first viewing impact indicates a total predicted amount of time spent viewing the first media package in the upcoming time period.

Process 800 continues at 835, where the control circuitry 604 predicts, using the second release schedule and the viewing patterns of the subscriber, a second viewing impact of the second subscription for the upcoming time period, wherein the second viewing impact indicates a total predicted amount of time spent viewing the second media package in the upcoming time period.

At 840, the control circuitry 604 determines an available amount of time for viewing media in the upcoming time period.

Process 800 continues at 845, where the control circuitry 604 generates a subscription recommendation for the upcoming time period based on the viewing impact of the first subscription, the viewing impact of the second subscription, and the amount of time the subscriber has available to consume media content. One exemplary embodiment for generating the subscription recommendation is described later with reference to FIG. 12.

In some embodiments, the control circuitry 604 may continue process 800 by generating a subscription modification message associated with the second subscription. The control circuitry 604 may then transmit that subscription modification message to a subscription management server. Furthermore, the control circuitry 604 may generate, for display in a media guidance application, a notification indicating the subscription modification message was transmitted to the subscription management server. For example, the control circuitry 604 may generate a subscription modification message to indicate a second subscription should be cancelled and transmit that subscription modification message to a server associated with the second subscription. It may be that the control circuitry 604 determined that Netflix should be cancelled for the upcoming time period. Therefore, the control circuitry 604 generates a message to send to Netflix's servers that tells Netflix to cancel the subscriber's subscription to Netflix. For example, the media guidance application may contact a web service using JavaScript Object Notation (JSON) formatted requests to send to a subscription management server. The control circuitry 604 may also generate, for display to the subscriber, a notification indicating the subscription modification message was transmitted to the subscription management server.

Figure 9:
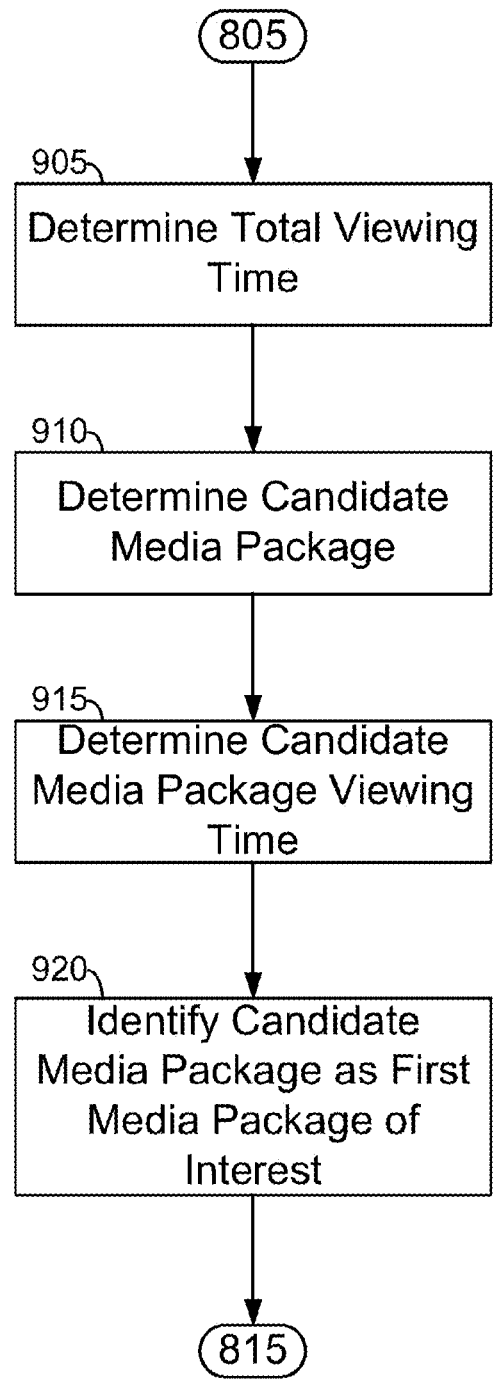
FIG. 9 depicts an illustrative flowchart of a process for determining a media package of interest, in accordance with some embodiments of the disclosure.

FIG. 9 depicts an illustrative flowchart of a process for determining a media package of interest, in accordance with some embodiments of the disclosure. Process 810A may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 810A begins at 905, where control circuitry 604, using a media guidance application, determines a total viewing time associated with the subscriber and the plurality of media packages based on the viewing patterns of the subscriber. For example, the control circuitry 604 may determine that the subscriber subscribes to HBO and HBO is releasing a new season of Game of Thrones and a new season of Westworld. Both Game of Thrones and Westworld are media packages related to a first subscription, HBO. The control circuitry 604 determines a total viewing time associated with the subscriber and the plurality of media packages based on the viewing patterns of the subscriber. For example, the control circuitry 604 may determine that the subscriber historically spends approximately 300 minutes viewing HBO shows in July and August.

At 910, the control circuitry 604 continues process 810A by determining a candidate media package from the plurality of media packages. For example, the control circuitry 604 may determine that Game of Thrones is a potential media package of interest because the subscriber historically watches Game of Thrones during the upcoming time period, perhaps July and August.

The process continues at 915, where the control circuitry 604 determines a candidate media package viewing time associated with the subscriber and the candidate media package. Continuing the example, the control circuitry 604 may determine that the upcoming run time of Game of Thrones for July and August is 445 minutes.

At 920, the control circuitry 604 continues process 810A by identifying the candidate media package as the first media package of interest based on a comparison of the total viewing time and the first package viewing time. For example, the control circuitry 604 may determine that Game of Thrones is an important media package from the HBO subscription because its run time meets, or even exceeds, the subscriber's historical consumption of HBO for the same time period.

Figure 10:
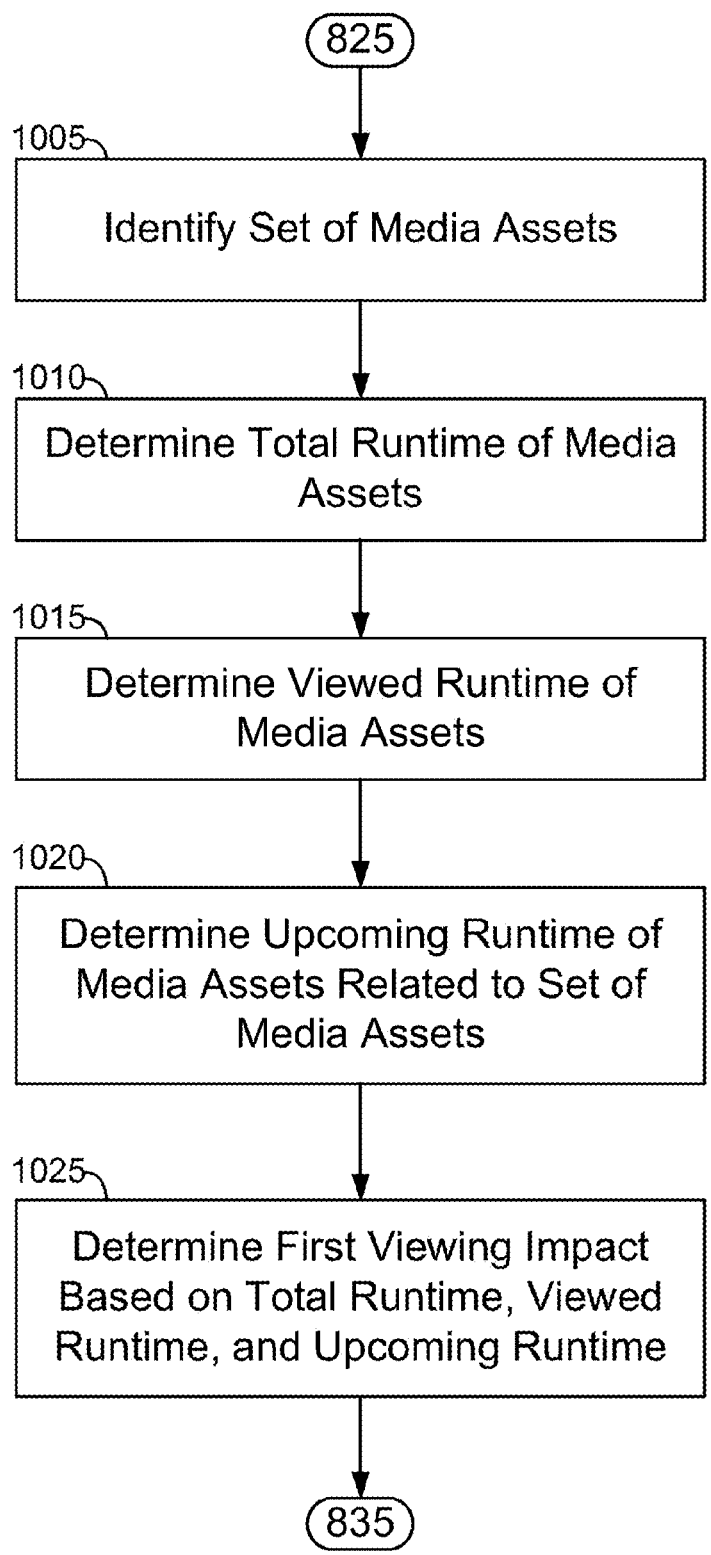
FIG. 10 depicts an illustrative flowchart of a process for predicting a viewing impact associated with a media content subscription, in accordance with some embodiments of the disclosure.

FIG. 10 depicts an illustrative flowchart of a process for predicting a viewing impact associated with a media content subscription, in accordance with some embodiments of the disclosure. Process 830A may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 830A begins at 1005, where control circuitry 604 may, using a media guidance application, identify a set of viewed media assets associated with the first media package that the subscriber previously viewed. The control circuitry 604 identifies the set of viewed media assets so that each media asset in the set of viewed media assets is related to the other media assets in the set of viewed media assets based on one or more characteristics associated with the set of viewed media assets. For example, using the viewing patterns of the subscriber, the control circuitry 604 may identify that the subscriber previously watched four episodes of Game of Thrones associated with a subscription to HBO.

At 1010, the control circuitry 604 continued process 830A by determining a total run time of the set of viewed media assets. For example, the control circuitry 604 may determine that the run time of the four Game of Thrones episodes was 200 minutes.

The process continues at 1015, where the control circuitry 604 determines a viewed run time associated with the subscriber and the set of viewed media assets. Continuing the example, the control circuitry 604 may determine that the subscriber didn't watch all of the run time of the four episodes, instead the subscriber only watched 160 minutes out of the 200 total minutes.

The control circuitry 604 continues process 930A at 1020 where it determines an upcoming run time of media assets related to the first media package of interest that also share one or more of the characteristics associated with the set of viewed media assets. For example, the control circuitry 604 may determine that the new season of Game of Thrones contains 445 minutes of run time.

Process 830A continues at 1025 where the control circuitry 604 determines the first viewing impact of the first subscription based on the total run time, the viewed run time, and upcoming run time. For example, the control circuitry 604 determines that the subscriber previously watched 80% of the run time of the Game of Thrones episodes they started. The control circuitry 604 may, therefore, determine that the first viewing impact should only account for 80% of the upcoming run time, or 356 minutes, based on the subscriber's viewing history.

Figure 11:
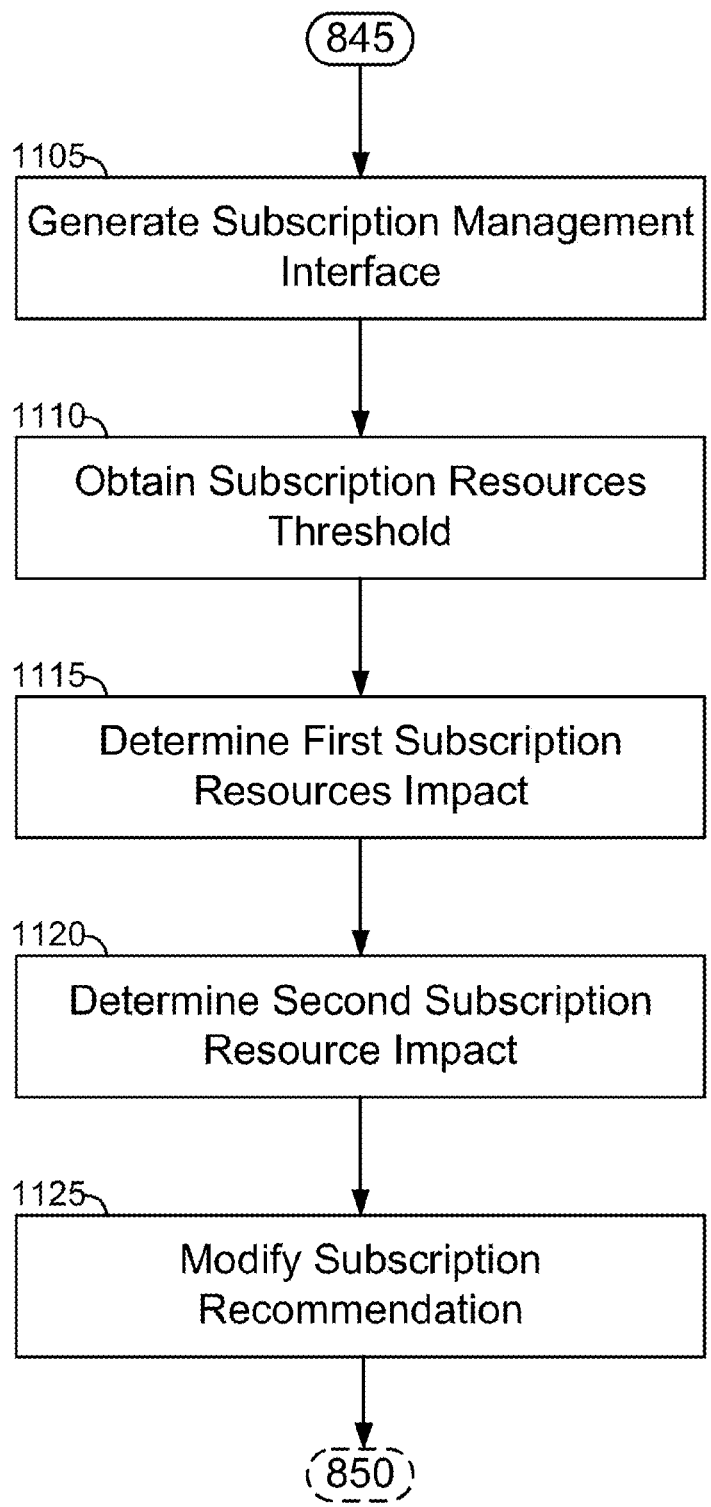
FIG. 11 depicts an illustrative flowchart of a process for modifying the subscription recommendation based on subscription resources impact, in accordance with some embodiments of the disclosure.

FIG. 11 depicts an illustrative flowchart of a process for modifying the subscription recommendation based on subscription resources impact, in accordance with some embodiments of the disclosure. Process 1100 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 1100 begins at 1105, where control circuitry 604, using a media guidance application, generates, for display to a subscriber, a subscription management interface. For example, the control circuitry 604 may generate subscription management interface 310 from FIG. 3.

The control circuitry 604 continues at 1110, where it obtains, from the subscriber using the subscription management interface, a subscription resources threshold. For example, the control circuitry 604 may receive a budget from the subscriber for the subscriber's period expenditures on media content subscriptions, e.g., $165/month.

Process 1100 continues at 1115 where the control circuitry 604 determines a first subscription resources impact associated with the first subscription. For example, the control circuitry 604 may determine that HBO costs the subscriber $15/month.

At 1120, the control circuitry 604 determines a second subscription resources impact associated with the second subscription. For example, the control circuitry 604 may determine that Netflix costs the subscriber $10/month.

Figure 12:
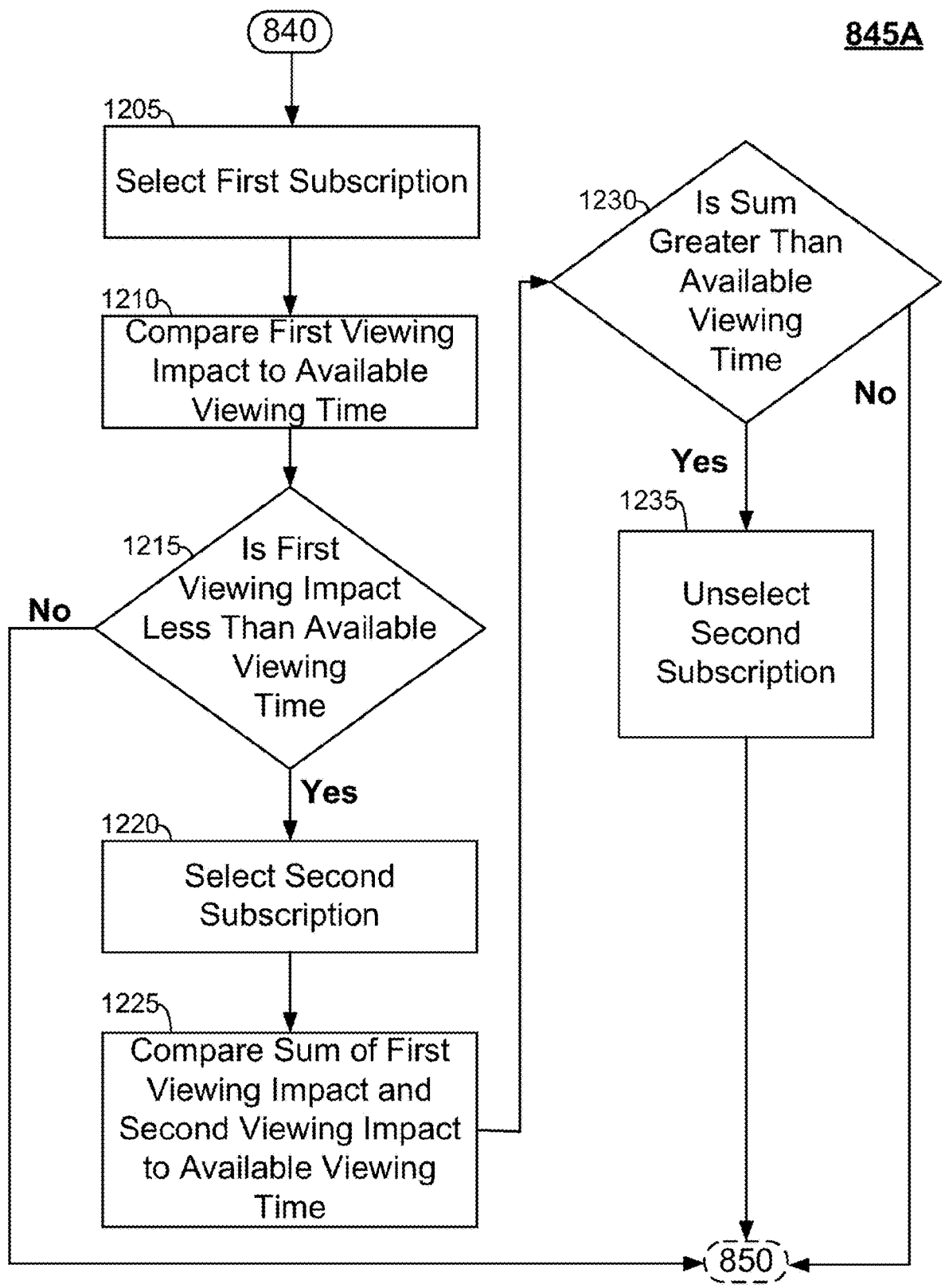
FIG. 12 depicts an illustrative flowchart of a process for generating a subscription recommendation, in accordance with some embodiments of the disclosure.

Process 1100 continues at 1125, where the control circuitry 604 modifies the subscription recommendation based on comparing the first subscription resources impact, the second subscription resources impact, and the subscription resources threshold. For example, the control circuitry 604 may determine that the subscriber's budget for monthly media consumption is $165. The control circuitry 604 may also determine that subscriptions to services beyond HBO and Netflix, perhaps the subscriber's cable and internet bill, account for $155. Thus, the subscriber may have only $10 of remaining budget to allocate between HBO and Netflix in this example. The control circuitry 604 may, therefore, determine that the subscriber does not have resources to maintain the HBO subscription and will determine, instead, to cancel the HBO subscription FIG. 12 depicts an illustrative flowchart of a process for generating a subscription recommendation, in accordance with some embodiments of the disclosure. Process 845A may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 845A begins at 1205, where control circuitry 604 may, using a media guidance application, select a first subscription. For example, the control circuitry 604 may determine, based on the subscriber's viewing patterns, the upcoming release schedule, and other factors, that the subscription recommendation should indicate that the subscriber should maintain an HBO subscription. Therefore, the control circuitry 604 may select the HBO subscription.

At 1210, the control circuitry 604 continues process 845A by comparing a first viewing impact associated with the first subscription, which indicates the predicted amount of time the subscriber will consume viewing media content in the first subscription to the amount of time the subscriber has available to consume media content in the upcoming time period. At 1215, control circuitry 604 determines whether the first viewing impact is less than the available viewing time. If the first viewing impact is not less than the available viewing time, process 845A concludes. If the first viewing impact is less than the available viewing time, the process continues at 1220.

At 1220, the control circuitry 604 selects a second subscription for inclusion in the subscription recommendation. At 1220, the control circuitry 604 continues process 845A by comparing the sum of the first viewing impact associated with the first subscription and the second viewing impact associated with the second subscription, which indicates the predicted amount of time the subscriber will consume viewing media content in the second subscription, to the amount of time the subscriber has available to consume media content in the upcoming time period. If the sum is greater than the available viewing time, i.e., the subscribe will not have enough time to consume all predicted media content in the first and second subscription for the upcoming time period, the control circuitry 604 continues process 845A at 1235. Otherwise, the control circuitry 604 concludes process 845A.

At 1235, the control circuitry 604 unselects the second subscription. For example, the control circuitry 604 may determine the subscriber will not have enough time to consume all the media content from an upcoming time period on HBO and Netflix. Therefore, the control circuitry 604 may remove the Netflix subscription, i.e., unselect the subscription, from the subscription recommendation. In some embodiments, the control circuitry 604 may also remove a subscription from a subscription recommendation because the corresponding viewing impact is predicted to be below a subscription maintenance threshold.

As used herein, "subscription maintenance threshold" is defined to mean an amount of time necessary for the control circuitry 604 to deem a subscription valuable to a subscriber. For example, when determining whether to keep a subscription, if the predicted impact of that subscription is 6 hours for the upcoming month, the control circuitry 604 may deem that subscription to be inefficient based on the subscription maintenance threshold. In some embodiments, the control circuitry 604 may be hard-coded with a subscription maintenance threshold. In other embodiments, the control circuitry 604 may store a modifiable subscription maintenance threshold. The control circuitry 604 may also retrieve a subscription maintenance threshold from an external source, e.g., a user profile stored on a remote server may contain the subscription maintenance threshold. Further, the control circuitry 604 may allow the subscriber to configure the subscription maintenance threshold, e.g., the control circuitry 604 may provide a user interface for setting the imminence threshold. In some embodiments, the subscription maintenance threshold may provide a ratio or formula that is used by the control circuitry 604 to compare a predicted impact of a subscription with cost associated with a subscription. For example, if a subscription costs $65/month and has a predicted impact of 6 hours for the upcoming period, that may be considered an inefficient subscription that should be cancelled.

Figure 13:
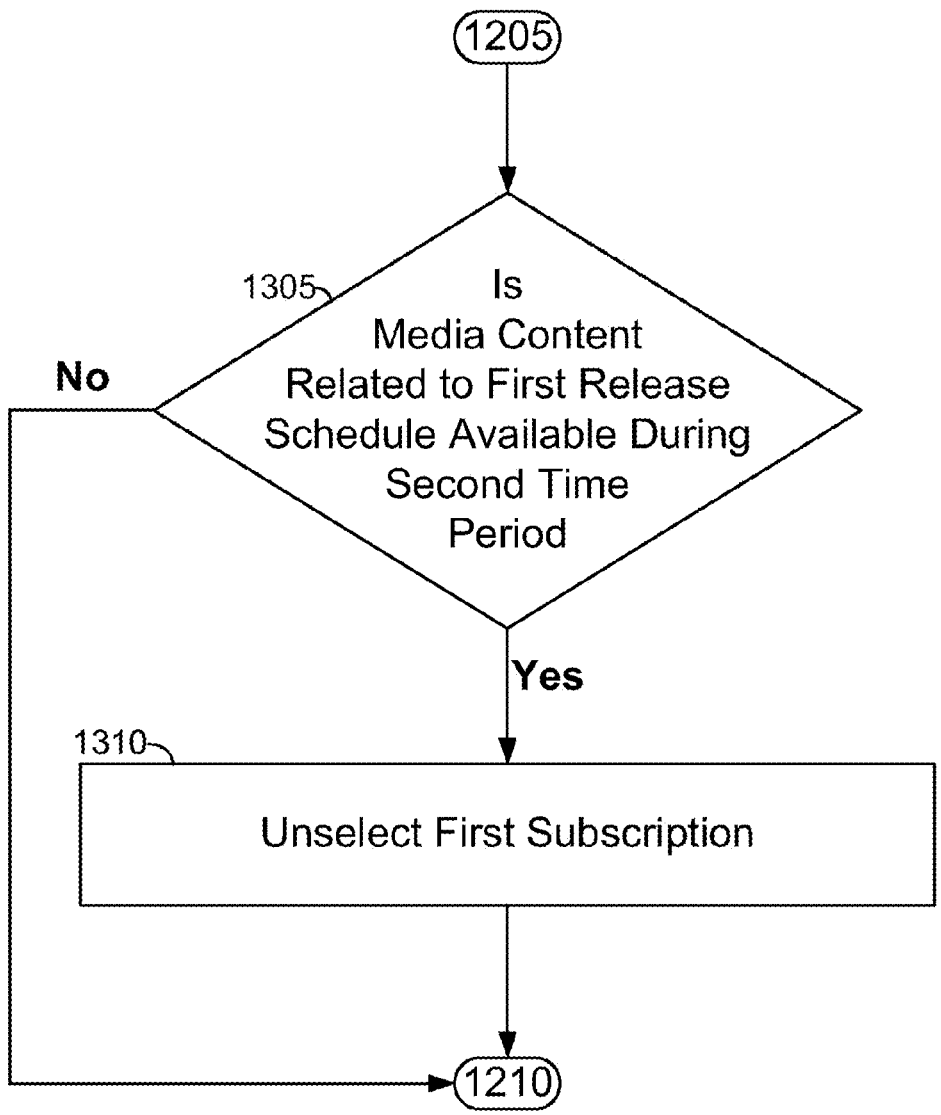
FIG. 13 depicts an illustrative flowchart of a process for modifying a subscription recommendation, in accordance with some embodiments of the disclosure.

FIG. 13 depicts an illustrative flowchart of a process for modifying a subscription recommendation, in accordance with some embodiments of the disclosure. Process 1300 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 1300 begins at 1305, where control circuitry 604, using a media guidance application, determines whether the media content related to the first release schedule will be available during a second time period that is subsequent to the upcoming time period. If the content will not be available later, the control circuitry 604 concludes process 1300. If the content will be available at a later time, the control circuitry 604 continues at 1310, where the control circuitry 604 modifies the selection of the first subscription by not selecting the first subscription. In some embodiments, the control circuitry 604 further considers subscription cost associated with the first release schedule and the subscription cost associated with the content in the second time period. For example, the control circuitry 604 may determine that Game of Thrones will be available at a later time on Amazon Prime. And because the subscriber has Amazon Prime for shopping, the control circuitry 604 considers this to be a free, or relatively inexpensive, media content subscription. Therefore, the control circuitry 604 may determine that it will be far more efficient for the subscriber to wait additional time to watch Game of Thrones through Amazon Prime instead of paying for an HBO subscription. In some embodiments, the control circuitry 604 may receive a preference from the subscriber for whether to cancel subscriptions in lieu of later release. In still other embodiments, the control circuitry 604 may analyze the subscriber's viewing patterns to determine whether to cancel the subscription in lieu of a later release of content on another service.

Figure 14:
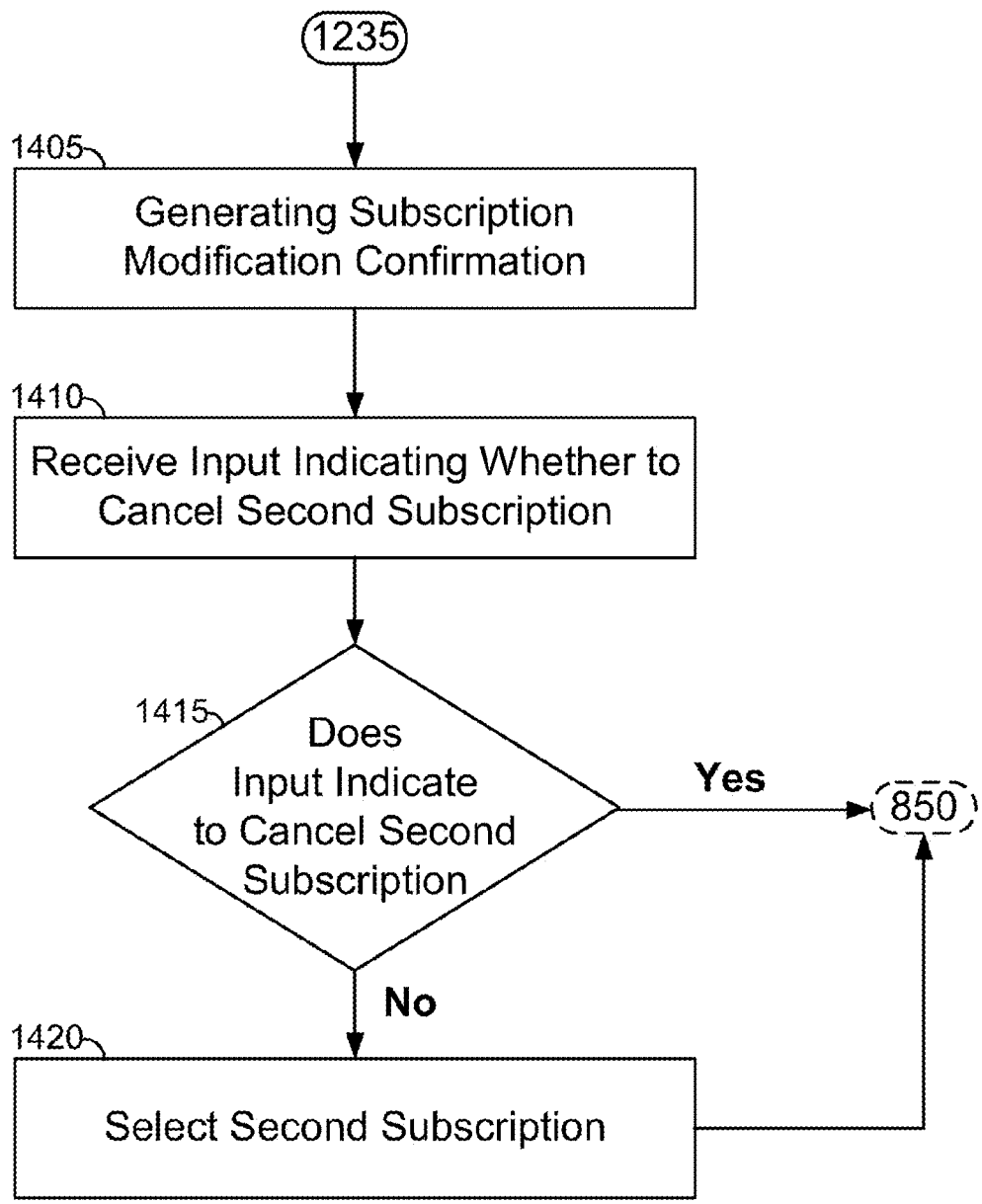
FIG. 14 depicts an illustrative flowchart of a process for receiving confirmation of subscription modifications, in accordance with some embodiments of the disclosure.

FIG. 14 depicts an illustrative flowchart of a process for receiving confirmation of subscription modifications, in accordance with some embodiments of the disclosure. Process 1400 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 1400 begins at 1405, where control circuitry 604 may, using a media guidance application, generate for display to a subscriber a subscription modification confirmation based on not selecting the second subscription. At 1410, the control circuitry 604 receives, from a subscriber, input indicating whether to cancel the second subscription. The control circuitry 604 determines whether the input indicates that the control circuitry 604 should cancel the second subscription. If the input indicates that the second subscription should be cancelled, the control circuitry 604 concludes process 1400. If the input indicates that the second subscription should not be cancelled, process 1400 continues at 1420. At 1420, control circuitry 604 changes the selection state of the second subscription by selecting the second subscription. Therefore, when the control circuitry 604 determines that a subscription should be cancelled, it may present an option to the subscriber with an appropriate input to confirm the recommendation.

Figure 15:
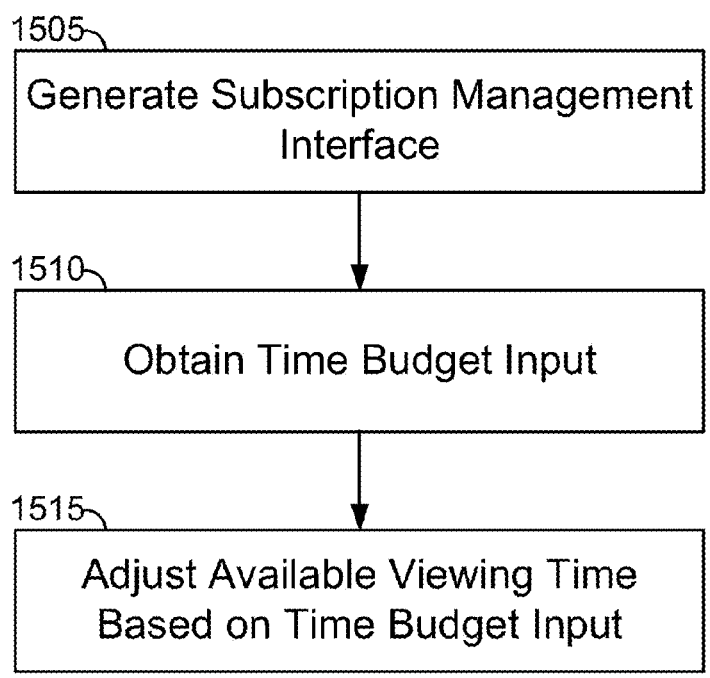
FIG. 15 depicts an illustrative flowchart of a process for adjusting the available viewing time based on subscriber input, in accordance with some embodiments of the disclosure.

FIG. 15 depicts an illustrative flowchart of a process for adjusting the available viewing time based on subscriber input, in accordance with some embodiments of the disclosure. Process 1500 may be executed by control circuitry 604 (e.g., in a manner instructed to control circuitry 604 by the media guidance application). Control circuitry 604 may be part of user equipment (e.g., user equipment 100, which may have any or all of the functionality of user television equipment 702, user computer equipment 704, and/or wireless communications device 706), or of a remote server separated from the user equipment by way of communication network 714, or distributed over a combination of both.

Process 1500 begins at 1505, where control circuitry 604, using a media guidance application,
generates, for display, a subscription management interface. For example, the control circuitry 604 may present subscriber interface screens that comprise textual representation of options for configuration. The control circuitry 604 may generate textboxes, sliders, numerical input boxes, combination text-icon input, wheels, or other input elements appropriate for receiving input from the subscriber. At 1510, the control circuitry 604 obtains, from the subscriber, a time budget input representative of the amount of time the control circuitry 604 should use for the amount of media content the subscriber can consume when determining whether the subscriber is over-subscribed to media content subscriptions. At 1515, the control circuitry 604 adjusts the available amount of time based on the time budget input.

It should be noted that the processes described with reference to FIGS. 8-15 or any step thereof could be performed on, or provided by, any of the devices shown in FIGS. 1-2 and 6-7. For example, any of the processes described with reference to FIGS. 8-20 may be executed by control circuitry 604 (FIG. 6) as instructed by control circuitry implemented on user equipment 702, 704, 706 (FIG. 7), and/or a user equipment device for playback of a media asset. In addition, one or more steps of the processes described with reference to FIGS. 8-15 may be incorporated into or combined with one or more steps of any other process or embodiment.

It is contemplated that the steps or descriptions of each of FIGS. 8-15 may be used with any other embodiment of this disclosure. In addition, the steps and descriptions described in relation to FIGS. 8-15 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 1-2 and 6-7 could be used to perform one or more of the steps in FIGS. 8-15.

It will be apparent to those of ordinary skill in the art that methods involved in the present invention may be embodied in a computer program product that includes a computer-usable and/or -readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining a position of a user may be performed, e.g., by processing circuitry 606 of FIG. 6. The processing circuitry, for instance, may be a general purpose processor, a customized integrated circuit (e.g., an ASIC), or a field-programmable gate array (FPGA) within user equipment 60, media content source 716, or media guidance data source 718. For example, a profile, as described herein, may be stored in, and retrieved from, storage 608 of FIG. 6, or media guidance data source 718 of FIG. 7. Furthermore, processing circuitry, or a computer program, may update settings of user equipment 100 stored within storage 608 of FIG. 6 or media guidance data source 718 of FIG. 7.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may refer to "convention," any such reference is merely to provide context to the invention(s) of the instant disclosure, and does not form any admission as to what constitutes the state of the art.

What is claimed is:

1. A method comprising:
generating for display a graphical user interface (GUI), wherein the user interface input comprises:
a first plurality of user interface elements for accepting an input of a first anticipated time allocation for a first subscription over a time period; and
a second plurality of user interface elements for accepting an input of a second anticipated time allocation for a second subscription over the time period;
receiving a user interface input via the GUI defining the first anticipated time allocation and the second anticipated time allocation; and
generating for display a first plurality of recommendations of media content available for the first subscription and a second plurality of recommendations of media content available for the second subscription based on the first anticipated time allocation and the second anticipated time allocation received by the user interface input.

2. The method of claim 1, further comprising:
accessing a release schedule related to media content available for the first subscription to be released in the time period.

3. The method of claim 1, further comprising:
accessing a release schedule related to media content available for the second subscription to be released in the time period.

4. The method of claim 1, further comprising:
accessing viewing patterns of a subscriber of the first subscription from a previous time period; and
determining an available amount of time that the user will be able to watch media content available on the first subscription in the time period.

5. The method of claim 1, further comprising:
accessing viewing patterns of a subscriber of the second subscription from a previous time period; and
determining an available amount of time that the user will be able to watch media content available on the second subscription in the time period.

6. The method of claim 5, further comprising:
determining a total amount of time that the subscriber spends viewing media content during the time period across the first subscription and the second subscription.

7. The method of claim 5, further comprising:
determining that the second anticipated time allocation received by the user interface input exceeds the available amount of time that the user will be able to watch media content available on the second subscription in the time period; and
generating for display a subscription modification message associated with the second subscription.

8. The method of claim 7, wherein the subscription modification message associated with the second subscription recommends canceling the second subscription.

9. A system comprising:
control circuitry configured to:
generate for display a graphical user interface (GUI), wherein the user interface input comprises:

a first plurality of user interface elements for accepting an input of a first anticipated time allocation for a first subscription over a time period; and a second plurality of user interface elements for accepting an input of a second anticipated time allocation for a second subscription over the time period;

input/output circuitry configured to:

receive a user interface input via the GUI defining the first anticipated time allocation and the second anticipated time allocation; and wherein the control circuitry is further configured to:

generate for display a first plurality of recommendations of media content available for the first subscription and a second plurality of recommendations of media content available for the second subscription based on the first anticipated time allocation and the second anticipated time allocation received by the user interface input.

10. The system of claim 9, wherein the control circuitry is further configured to:

access a release schedule related to media content available for the first subscription to be released in the time period.

11. The system of claim 9, wherein the control circuitry is further configured to:

access a release schedule related to media content available for the second subscription to be released in the time period.

12. The system of claim 9, wherein the control circuitry is further configured to:

access viewing patterns of a subscriber of the first subscription from a previous time period; and determine an available amount of time that the user will be able to watch media content available on the first subscription in the time period.

13. The system of claim 9, wherein the control circuitry is further configured to:

access viewing patterns of a subscriber of the second subscription from a previous time period; and determine an available amount of time that the user will be able to watch media content available on the second subscription in the time period.

14. The system of claim 13, wherein the control circuitry is further configured to:

determine a total amount of time that the subscriber spends viewing media content during the time period across the first subscription and the second subscription.

15. The system of claim 13, wherein the control circuitry is further configured to:

determine that the second anticipated time allocation received by the user interface input exceeds the available amount of time that the user will be able to watch media content available on the second subscription in the time period; and generate for display a subscription modification message associated with the second subscription.

16. The system of claim 15, wherein the subscription modification message associated with the second subscription recommends canceling the second subscription.

* * * * *